(12) United States Patent
Roman et al.

(10) Patent No.: US 9,766,040 B2
(45) Date of Patent: *Sep. 19, 2017

(54) RELATIVE AIMING POINT DISPLAY

(71) Applicants: Kendyl A Roman, Sunnyvale, CA (US); John Livacich, Sunnyvale, CA (US)

(72) Inventors: Kendyl A Roman, Sunnyvale, CA (US); John Livacich, Sunnyvale, CA (US)

(73) Assignee: Evrio, Inc., Santa Clara, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/592,902

(22) Filed: Jan. 9, 2015

(65) Prior Publication Data

US 2016/0202021 A1 Jul. 14, 2016

(51) Int. Cl.
*G09G 5/00* (2006.01)
*F41G 3/06* (2006.01)
*F41G 3/08* (2006.01)
*F41G 3/16* (2006.01)
*G01C 3/08* (2006.01)

(52) U.S. Cl.
CPC ............... *F41G 3/06* (2013.01); *F41G 3/08* (2013.01); *F41G 3/165* (2013.01); *G01C 3/08* (2013.01)

(58) Field of Classification Search
None
See application file for complete search history.

(56) References Cited

U.S. PATENT DOCUMENTS

| | | | | |
|---|---|---|---|---|
| 6,166,744 A * | 12/2000 | Jaszlics | | G06T 17/00 345/421 |
| 8,282,493 B2 * | 10/2012 | Roman | | F41G 1/467 463/2 |
| 2003/0010190 A1 * | 1/2003 | Sammut | | F41G 1/38 89/41.17 |
| 2003/0071904 A1 * | 4/2003 | Karasaki | | H04N 1/00453 348/231.3 |
| 2007/0060233 A1 * | 3/2007 | Liccardo | | A63F 13/10 463/8 |
| 2007/0144052 A1 * | 6/2007 | Smith, III | | F41G 1/38 42/122 |
| 2010/0107127 A1 * | 4/2010 | Han | | G06F 3/04815 715/848 |
| 2013/0278633 A1 * | 10/2013 | Ahn | | G06T 19/006 345/633 |
| 2014/0104423 A1 * | 4/2014 | Choi | | G06K 9/00791 348/148 |
| 2015/0206329 A1 * | 7/2015 | Devries | | G06T 11/00 345/633 |

* cited by examiner

*Primary Examiner* — Frank Chen

(57) ABSTRACT

An improved display provides an intermediate point in the projectile trajectory being an aiming point and indicated in relation to the visualized target or target reference. The rangefinder device is calibrated to a weapon having a sight, for example, having a riflescope calibrated at 100 yards. The aiming point is displayed showing the intermediate point in the projectile trajectory that corresponds with riflescope cross hairs at a predetermined zero setting. The user places the riflescope cross hairs on the point visualized in the display. Alternatively, the aiming point is displayed relative to the magnified image of the target, a generic reference images, or a user selectable reference image.

20 Claims, 22 Drawing Sheets

RELATIVE AIMING POINT DISPLAY

BACKGROUND

Field of the Invention

The present invention relates to a display that provides information regarding a projectile trajectory including a relative aiming point. The display includes a reference indictor such as a reference image or reference lines and the relative aiming point.

Description of Prior Art

Bows and arrows, spears, crossbows, guns, and artillery have been used for sport, hunting, and military.

An arrow is typically shot using the arms to pull back the bow string, and to aim and sight by holding the bow and arrow next to the archer's eye. More recently bow sights have been added to all types of bows. Typically a bow sight comprises a plurality of pins that may be adjusted by the archer for aiming at targets at different distances. Some bow sights have a single adjustable pin that is moved to the match the distance to the target.

Balls and/or bullets are typically shot from a gun using the arms to aim and sight by aligning the gun sights or gun scope reticle with the target.

Artillery balls and shells are typically shot by adjusting the aim mechanically.

Arrows, spears, balls, bullets, and shells when fired follow a ballistic trajectory. Such projectiles, which are not self-propelled, move through air according to a generally parabolic (ballistic) curve due primarily to the effects of gravity and air drag.

Rifle and bow scopes conventionally have been fitted with reticles of different forms. Some have horizontal and vertical cross hairs. Others reticles such as mil-dot add evenly spaced dots for elevation and windage along the cross hairs. U.S. Design Pat. No. D522,030, issued on May 30, 2006, shows a SR reticle and graticle design for a scope. Various reticles, such as Multi Aim Point (MAP) and Dot are provided, for example, by Hawke Optics (http://hawkeoptics.com). These reticles are fixed in that the display does not change based on range information. Also, these reticles indicate the approximate hold-over position in that they are positioned under the center of the scope, i.e. below where the cross hairs intersect. They are not necessarily precise, for example, for a specific bow and archer or for a specific rifle and ammunition, but are approximation for the general case.

Hunters and other firearm and bow users commonly utilize handheld rangefinders (see device 10 in FIG. 2) to determine ranges to targets. Generally, handheld rangefinders utilize lasers to acquire ranges for display to a hunter. Utilizing the displayed ranges, the hunter makes sighting corrections to facilitate accurate shooting.

For example, U.S. Pat. No. 7,658,031, issued Feb. 9, 2010, discloses handheld rangefinder technology from Bushnell, Inc, and is hereby included by reference. As shown in FIG. 1, a handheld rangefinder device 10 generally includes a range sensor 12 operable to determine a first range to a target, a tilt sensor 14 operable to determine an angle to the target relative to the device 10, and a computing element 16, coupled with the range sensor 12 and the tilt sensor 14, operable to determine a hold over value based on the first range and the determined angle. The range information is displayed on a display 30. A housing 20 contains the elements of the device 10. Bushnell Angle Range Compensation (ARC) rangefinders show the first linear range to the target and also show an angle and a second range, which represents the horizontal distance to the target. Handheld rangefinders, telescope sights, and other optical devices typically comprise a laser range sensor and an inclinometer.

The range information is superimposed over the image that is seen through the optics. For example, U.S. Design Pat. No. D453,301, issued Feb. 5, 2002, shows an example of a design for a display for a Bushnell rangefinder, and is hereby included by reference. FIG. 2 shows an exemplary display 30 appearing in a handheld rangefinder device 10.

With convention rangefinder and a rifle there is no correlation between the display of the rangefinder and the user's individual rifle sight or scope. To make an effective shot requires several steps. All of the movement and time taken during these steps will likely be noticed by the target and allow the target an opportunity to move resulting in having to repeat the process or miss the shot altogether.

What is needed is an improved display that provides a relative aiming point relative to a reference with a predetermined size or height, so the user can visualize where to aim.

SUMMARY OF THE INVENTION

The present invention solves the above-described problems and provides a distinct advance in the art of rangefinder display. More particularly, the invention provides a display that provides a relative aiming point relative to a reference with a predetermined size or height, so the user can visualize where to aim. Such information facilitates accurate, effective, and safe firearm use.

In multiple embodiments, a display provides a relative aiming point that is display relative to a reference that shows the relative target size.

In some embodiments of a display with relative aiming point, the reference is a reference image.

In some embodiments of a display with relative aiming point, the reference is a reference indicator, shown as reference lines.

In some embodiments of a display with relative aiming point, the display further comprises reference multiples.

In some embodiments of a display with relative aiming point, the reference is a user selectable image.

In some embodiments of a display with relative aiming point, the reference is a generic reference image.

In some embodiments of a display with relative aiming point, the reference is an enlarged target reference.

In some embodiments of a display with relative aiming point, the reference is a zoomed target image.

Accordingly, it is an objective of the present invention to provide a display that provides information regarding a projectile trajectory so that a user is informed whether or not there is a clear shot.

Other aspects and advantages of the present invention will be apparent from the following detailed description of the preferred embodiments and the accompanying drawing figures.

OBJECTS AND ADVANTAGES

Accordingly, the present invention includes the following advantages:
 a) To provide a display that provides a relative aiming point.
 b) To provide a display that provides a relative aiming point relative to a reference target point.
 c) To provide a display that provides a relative aiming point relative to an enlarged actual image.

d) To provide a display that provides a relative aiming point relative to a reference image.
e) To provide a display that provides a relative aiming point relative to a reference indicator.
f) To provide a display that provides a relative aiming point relative to a reference indicator and reference multiples.
g) To provide a display that provides a relative aiming point relative to a generic reference.
h) To provide a display that provides a relative aiming point shown as virtual scope reticle.
i) To provide a display that provides dynamic information regarding a projectile trajectory.
j) To provide a rangefinder display having variable focal range (or zoom) with automatically adjusting indications of a virtual aiming point.
k) To provide an improved rangefinder which enable the user to visualize the projectile's trajectory creating confidence of a clear and safe shot.
l) To provide a digital display of a relative aiming point.
m) To provide a digital display of a relative aiming point and zoom control.
n) To provide an improved display of line of sight distance, horizontal distance, and angle.

DRAWING FIGURES

A preferred embodiment of the present invention is described in detail below with reference to the attached drawing figures, wherein.

Figure 1:
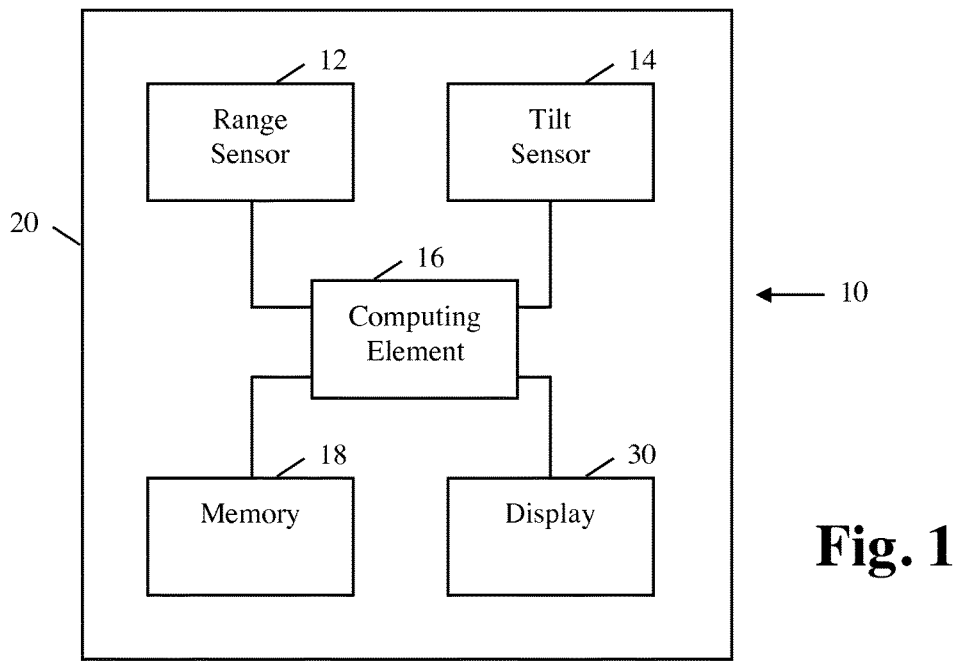
FIG. 1 is a block diagram of a rangefinder device.

The drawing figures do not limit the present invention to the specific embodiments disclosed and described herein. The drawings are not necessarily to scale, emphasis instead being placed upon clearly illustrating the principles of the invention.

| REFERENCE NUMERALS IN DRAWINGS | |
|---|---|
| 1 a-c | line of departure |
| 2 a-c | projectile trajectory |
| 3 a-c | line of sight |
| 4 | horizontal line |
| 5 | preception line |
| 10 | device |
| 11 | iPhone |
| 12 | range sensor |
| 14 | tilt sensor |
| 16 | computing element |
| 18 | memory |
| 20 | housing |
| 21 | alternate housing |
| 22 | eyepiece |
| 23 | housing slot |
| 24 | lens |
| 25 | digital camera |
| 26 | distal end |
| 27 | handle |
| 28 | proximate end |
| 30 | display |
| 31 | high-resolution display |
| 32 | inputs |
| 33 | trigger input |
| 34 a-b | display inputs |
| 35 | visor or shroud |
| 50 a-l | frame |
| 60 | redo path |
| 62 | range target step |
| 64 | observe obstacles step |
| 66 | range obstacle step |
| 68 | more obstacles decision |
| 70 | confirm clear shot step |
| 72 | determine range step |
| 74 | determine angle step |
| 76 | calculate trajectory step |
| 78 | scan trajectory path step |
| 80 | obstacle-in-path decision |
| 82 | yes path |
| 84 | warn not clear step |
| 86 | no path |
| 88 | indicate clear shot step |
| 100 | archer or user |
| 102 | bow |
| 104 | arrow |
| 110 | bow sight |
| 120 | bow string sight |
| 180 | paper target |
| 182 | twenty-yard mark |
| 184 | forty-yard mark |
| 190 | calibration sheet |
| 192 | twenty-yard calibration mark |
| 194 | forty-yard calibration mark |
| 196 | sixty-yard calibration mark |
| 198 | calibration instructions |
| 220 | twenty-yard pin |
| 240 | forty-yard pin |
| 260 | sixty-yard pin |
| 320 | twenty-yard line |
| 340 | forty-yard line |
| 420 | twenty-yard projection |
| 440 | forty-yard projection |
| 620 | virtual twenty-yard pin |
| 640 | virtual forty-yard pin |
| 660 | virtual sixty-yard pin |

-continued

| REFERENCE NUMERALS IN DRAWINGS | |
|---|---|
| 700 | obstacles |
| 710 | branch |
| 720 | bald eagle |
| 730 | bush |
| 800 a-b | image layer |
| 810 | image highlight |
| 900 | cross hairs |
| 910 | distance indicator |
| 912 | angle indicator |
| 914 | horizontal distance indicator |
| 920 | twenty-yard indicator |
| 930 | (selectable) path indicators |
| 932 | off screen indicator |
| 940 | forty-yard indicator |
| 950 | clear shot indicator |
| 960 | don't shoot indicator |
| 970 | not clear indicator |
| 980 | maximum indicator |
| 982 | aiming point |
| 984 | level |
| 986 a-b | rotation indicators |
| 990 | angle and second range indicator |
| 992 | bow mode indicator |
| 994 | rifle mode indicator |
| 996 | trajectory mode indicator |
| 998 | ring-of-fire indicator |
| 1000 | relative aiming point |
| 1002 | reference image |
| 1004 | reference target |
| 1005 | generic reference |
| 1006 | reference indicator |
| 1007 a-c | reference multiple |
| 1008 | separator |
| 1010 | aiming point indicators |
| 1020 | enlarged target image |
| 1022 | reference measurement |
| 1030 | zoom control |
| 1032 | settings control |
| 1034 | settings |
| 1040 a-b | virtual reticle |
| P a-c, 0, 20, 40 | point |
| θ a-c, 20-40 | angle |
| T a-c | target |
| V a-b | vertex |

DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Projectile Trajectories

Figure 3A:
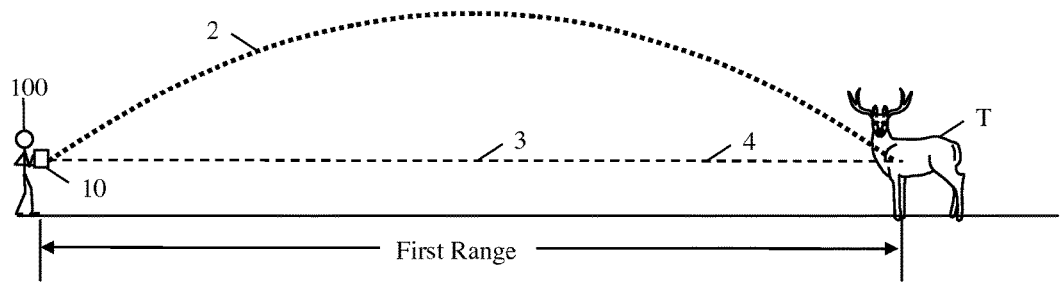
FIG. 3A is a diagram illustrating a first range to a target and an associated projectile trajectory.

FIG. 3A is a diagram illustrating a first range to a target T and an associated projectile trajectory 2. The rangefinder device 10 is show level such and the associated projectile trajectory leaves the weapon and enters the target at substantially the same true elevation (horizontal line 4).

The first range preferably represents a length of an imaginary line drawn between the device 10 and the target T, as shown in FIG. 3A, such as the number of feet, meters, yards, miles, etc., directly between the device 10 and the target T. Thus, the first range may correspond to a line of sight (LOS) 3 between the device 10 and the target T.

Figure 3B:
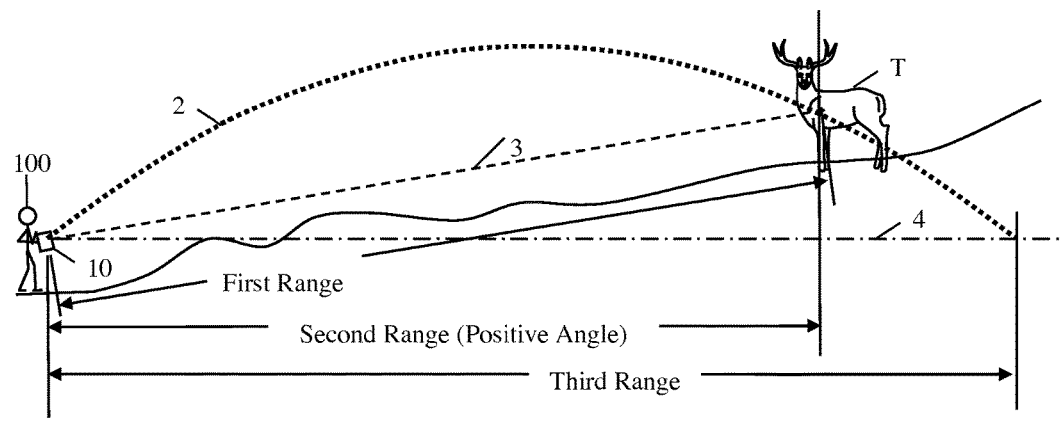
FIG. 3B is a diagram illustrating a second range and an associated projectile trajectory to the target of FIG. 3A when the target is elevated, i.e. at a positive angle.

FIG. 3B is a diagram illustrating a second range and an associated projectile trajectory 2 to the target T when the target T is elevated, i.e. is at a positive angle. The first range is the sensed range along the line of sight 3. The second range is the true horizontal distance to the target T, as measured along the horizontal line 4. A third range is the true horizontal distance, as measured along the horizontal line 4, to the projectile trajectory 2 intercept. Half of the third range is the x-axis distance to the vertex V of the projectile trajectory 2. The second range is determined by multiplying the first range by the cosine of the angle.

Figure 3C:
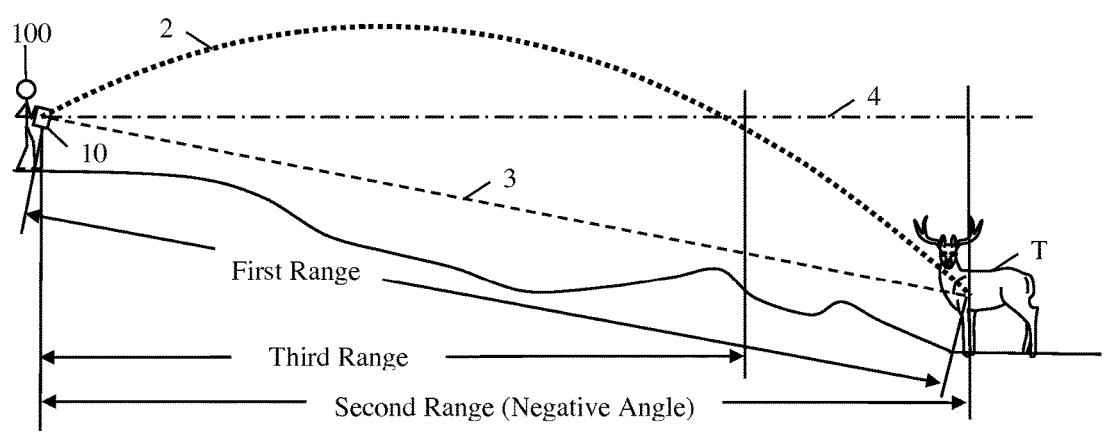
FIG. 3C is a diagram illustrating a second range and an associated projectile trajectory to the target when the target is at a lower elevation, i.e. at negative angle.

FIG. 3C is a diagram illustrating a second range and an associated projectile trajectory 2 to the target T when the target T is at a lower elevation, i.e. is at a negative angle. The first range is the sensed range along the line of sight 3. The second range is the true horizontal distance to the target T, as measured along the horizontal line 4. The third range is the true horizontal distance, as measured along the horizontal line 4, to the projectile trajectory 2 intercept. Half of the third range is the x-axis distance to the vertex V of the projectile trajectory 2.

In situations where the angle is non-zero, such as when the target T is positioned above (FIG. 3B) or below (FIG. 3C) the device 10, the parabolic movement of the projectile affects the range calculation, such that the projectile may have to travel a longer or shorter distance to reach the target T. Thus, the second range provides an accurate representation to the user of the flat-ground distance the projectile must travel to intersect the target T.

FIGS. 3A through 3C are shown with an exemplary projectile trajectory 2 based on a parabola with an A value of −0.005.

Aiming Point Displays

Figure 4:
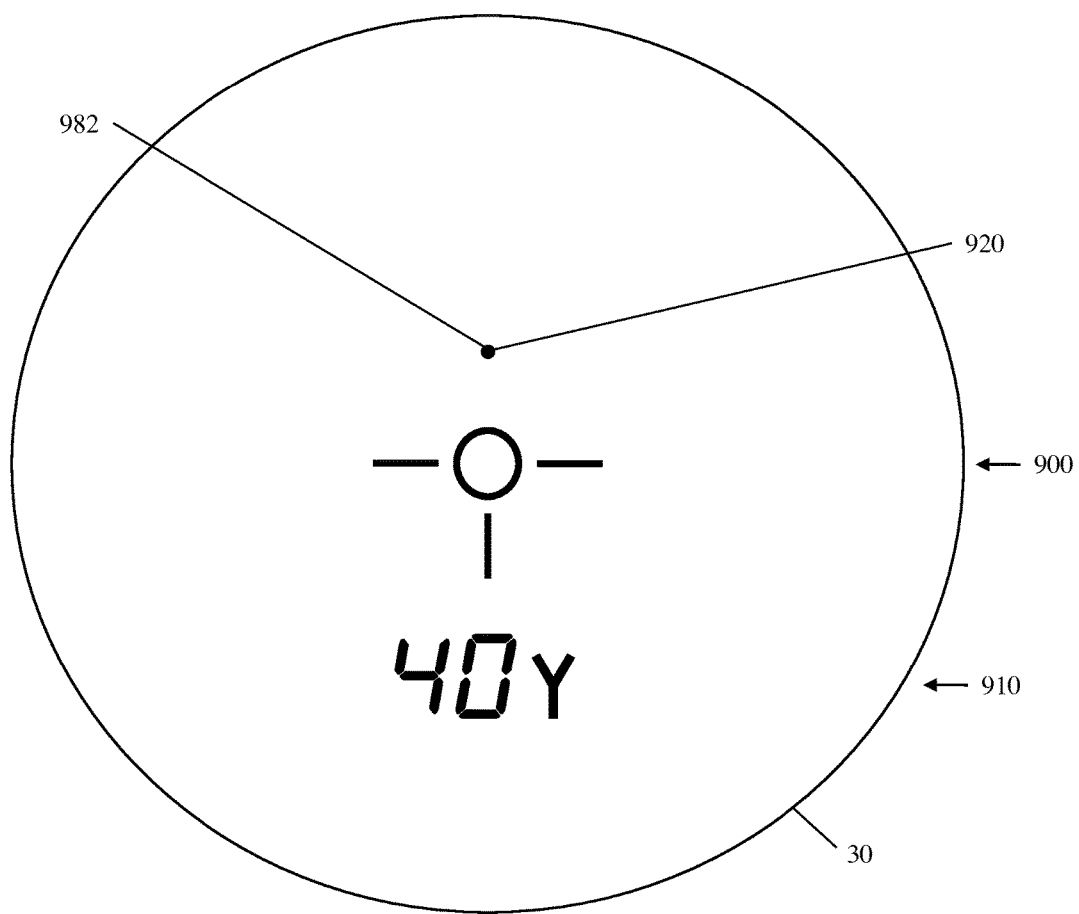
FIG. 4 illustrates a display having an aiming point.

FIG. 4 shows the active display elements when the target T (not shown for clarity) is ranged at forty yards. The display 30 shows the cross hairs 900 (show here with a center circle) which are placed on the target T. The display 30 dynamically shows that the range is forty yards in the distance indicator 910. The display 30 also dynamically illuminates a twenty-yard indicator 920. The twenty-yard indicator 920 informs the user where the projectile will be at twenty yards distance. Because the twenty-yard indicator 920 shows an intermediate trajectory path point where the arrow will be at twenty yards distance, the twenty-yard indicator 920 is a twenty-yard pin aiming point 982. A bow hunter can place the twenty-yard pin 220 of the bow sight 110 on the same visual spot indicated, for example as shown in FIG. 4, and the arrow will hit the target T at the cross hairs 900.

In the figures the symbols used for the various indicators are exemplary and other shapes or styles of indicators could be used. For example, the cross hairs 900 are shown with a center circle, but other styles such as intersecting lines, a solid center dot, and so forth could be used. Also the distance indicator 910 is shown having using seven segments for the digits, but other shapes of styles could be used. Positions are also exemplary.

The examples herein generally use yards as the unit of measure. The invention is not limited to yards, but could also be set using feet, meters, kilometers, miles, and so forth.

In some bow embodiments the display 30 or device 10 is calibrated such that the location of the twenty-yard indicator 920 matches the relative position of the twenty-yard pin 220 on the individual user's bow and bow sight 110.

Rangefinder Device

Figure 2:
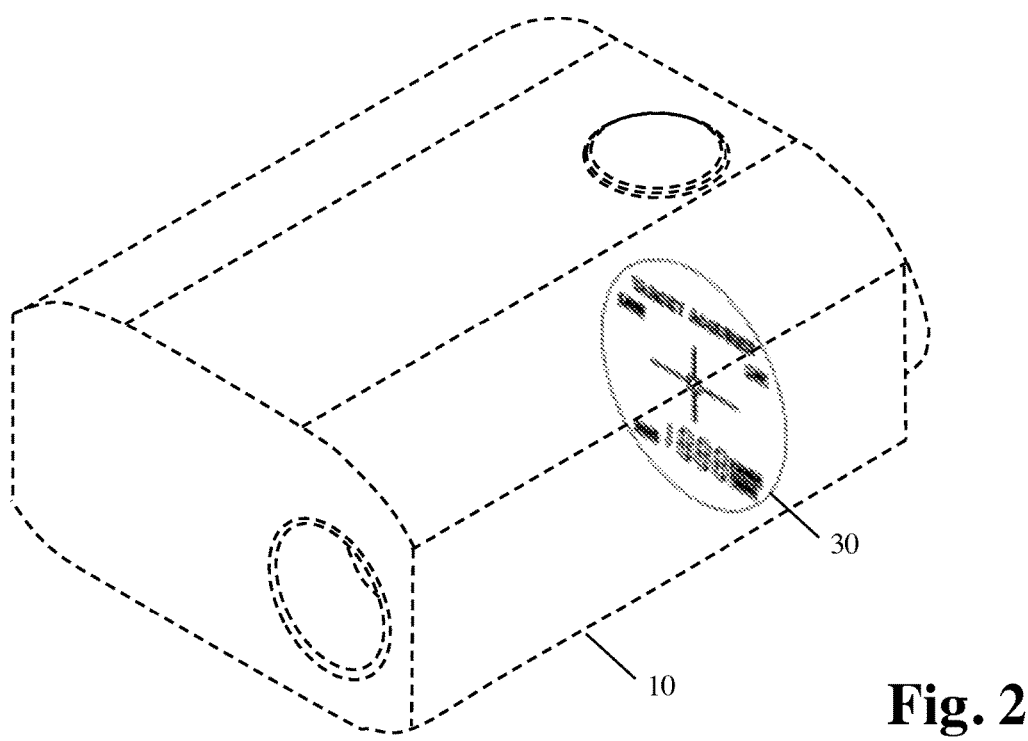
FIG. 2 shows the appearance of an exemplary display within a device.

FIG. 2 is a rear perspective view of an exemplary rangefinder device 10. FIG. 1 shows the internal components.

For instance, the user may look through the eyepiece 22, align the target T, view the target T, and generally simultaneously view the display 30 to determine the first range, the angle, the clear shot indications, and/or other relevant information. The generally simultaneous viewing of the target T and the relevant information enables the user to quickly and easily determine ranges and ballistic information corresponding to various targets by moving the device 10 in an appropriate direction and dynamically viewing the change in the relevant information on the display 30.

The portable handheld housing 20 houses the range sensor 12, tilt sensor 14, computing element 16, and/or other desired elements such as the display 30, one or more inputs 32, eyepiece 22, lens 24, laser emitter, laser detector, etc. The handheld housing 20 enables the device 10 be easily and safely transported and maneuvered for convenient use in a variety of locations.

For example, the portable handheld housing 20 may be easily transported in a backpack for use in the field. Additionally, the location of the components on or within the housing 20, such as the position of the eyepiece 22 on the proximate end 28 of the device 10, the position of the lens 24 on the distal end 26 of the device, and the location of the inputs 32, enables the device 10 to be easily and quickly operated by the user with one hand without a great expenditure of time or effort.

As discussed in reference to FIG. 3, generally a rangefinder device 10 generally includes a range sensor 12 for determining a first range to a target T, a tilt sensor 14 for determining an angle to the target T, a computing element 16 coupled with the range sensor 12 and the tilt sensor 14 for determining ballistic information relating to the target T based on the first range and the determined angle, a memory 18 for storing data such as ballistic information and a computer program to control the functionality of the device 10, and a portable handheld housing 20 for housing the range sensor 12, the tilt sensor 14, the computing element 16, the memory 18, and other components.

A computer program preferably controls input and operation of the device 10. The computer program includes at least one code segment stored in or on a computer-readable medium residing on or accessible by the device 10 for instructing the range sensor 12, tilt sensor 14, computing element 16, and any other related components to operate in the manner described herein. The computer program is preferably stored within the memory 18 and comprises an ordered listing of executable instructions for implementing logical functions in the device 10. However, the computer program may comprise programs and methods for implementing functions in the device 10 which are not an ordered listing, such as hard-wired electronic components, programmable logic such as field-programmable gate arrays (FPGAs), application specific integrated circuits, conventional methods for controlling the operation of electrical or other computing devices, etc.

Similarly, the computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The device 10 and computer programs described herein are merely examples of a device and programs that may be used to implement the present invention and may be replaced with other devices and programs without departing from the scope of the present invention.

The range sensor 12 may be any conventional sensor or device for determining range. The first range may correspond to a line of sight 3 between the device 10 and the target T. Preferably, the range sensor 12 is a laser range sensor which determines the first range to the target by directing a laser beam at the target T, detecting a reflection of the laser beam, measuring the time required for the laser beam to reach the target and return to the range sensor 12, and calculating the first range of the target T from the range sensor 12 based on the measured time.

The range sensor 12 may alternatively or additionally include other range sensing components, such as conventional optical, radio, sonar, or visual range sensing devices to determine the first range in a substantially conventional manner.

The tilt sensor 14 is operable to determine the angle to the target T from the device 10 relative to the horizontal. As discussed in reference to FIGS. 3A, 3B, and 3C, the tilt sensor is used to determine the angle of the line of sight 3. The tilt sensor 14 preferably determines the angle by sensing the orientation of the device 10 relative to the target T and the horizontal.

The tilt sensor 14 preferably determines the angle by sensing the orientation of the device 10 relative to the target T and the horizontal as a user 100 of the device 10 aligns the device 10 with the target T and views the target T through an eyepiece 22 and an opposed lens 24.

For example, if the target T is above the device 10 (e.g. FIG. 3B), the user of the device 10 would tilt the device 10 such that a distal end 26 of the device 10 would be raised relative to a proximate end 28 of the device 10 and the horizontal. Similarly, if the target T is below the device 10 (e.g. FIG. 3C), the user of the device 10 would tilt the device 10 such that the distal end 26 of the device 10 would be lowered relative to the proximate end 28 of the device and the horizontal.

The tilt sensor 14 preferably determines the angle of the target to the device 10 based on the amount of tilt, that is the amount the proximate end 28 is raised or lowered relative to the distal end 26, as described below. The tilt sensor 14 may determine the tilt of the device, and thus the angle, through various orientation determining elements. For instance, the tilt sensor 14 may utilize one or more single-axis or multiple-axis magnetic tilt sensors to detect the strength of a magnetic field around the device 10 or tilt sensor 14 and then determine the tilt of the device 10 and the angle accordingly. The tilt sensor 14 may determine the tilt of the device using other or additional conventional orientation determine elements, including mechanical, chemical, gyroscopic, and/or electronic elements, such as a resistive potentiometer.

Preferably, the tilt sensor 14 is an electronic inclinometer, such as a clinometer, operable to determine both the incline and decline of the device 10 such that the angle may be determined based on the amount of incline or decline. Thus, as the device 10 is aligned with the target T by the user, and the device 10 is tilted such that its proximate end 28 is higher or lower than its distal end 26, the tilt sensor 14 will detect the amount of tilt which is indicative of the angle.

The computing element 16 is coupled with the range sensor 12 and the tilt sensor 14 to determine ballistic information relating to the target T, including clear shot information, as is discussed herein. The computing element 16 may be a microprocessor, microcontroller, or other electrical element or combination of elements, such as a single integrated circuit housed in a single package, multiple integrated circuits housed in single or multiple packages, or any other combination. Similarly, the computing element 16 may be any element that is operable to determine clear shot information from the range and angle information as well as other information as described herein. Thus, the computing element 16 is not limited to conventional microprocessor or microcontroller elements and may include any element that is operable to perform the functions described.

The memory 18 is coupled with the computing element 16 and is operable to store the computer program and a database including ranges, projectile drop values, and configuration information. The memory 18 may be, for example, an electronic, magnetic, optical, electromagnetic, infrared, or semi-conductor system, apparatus, device, or propagation medium.

The device 10 also preferably includes a display 30 to indicate relevant information such as the cross hairs 900, distance indicator 910, selectable path indicators 930, clear shot indicator 950, don't shoot indicator 960, not clear indicator 970. The display 30 may be a conventional electronic display, such as a LED, TFT, or LCD display. Preferably, the display 30 is viewed by looking through the eyepiece 22 such that the user may align the target T and simultaneously view relevant information. The illuminated segments may be parallel to the optical path (e.g. horizontal) between the eyepiece 22 and the opposed lens 24 and reflect to a piece of angled glass in the optical path.

The inputs 32 are coupled with the computing element 16 to enable users or other devices to share information with the device 10. The inputs 32 are preferably positioned on the housing 20 to enable the user to simultaneously view the display 30 through the eyepiece 22 and function the inputs 32.

The inputs 32 preferably comprise one or more functionable inputs such as buttons, switches, scroll wheels, etc., a touch screen associated with the display 30, voice recognition elements, pointing devices such as mice, touchpads, trackballs, styluses, combinations thereof, etc. Further, the inputs 32 may comprise wired or wireless data transfer elements.

In operation, the user aligns the device 10 with the target T and views the target T on the display 30. The device 10 may provide generally conventional optical functionality, such as magnification or other optical modification, by utilizing the lens 24 and/or the computing element 16. Preferably, the device 10 provides an increased field of vision as compared to conventional riflescopes to facilitate conventional rangefinding functionality. The focal magnification, typically is 4×, 5×, 7×, 12× and so forth. In some embodiments the magnification factor is variable, such as with a zoom feature. This magnification value is used by the computing element 16 in performing the mapping of the various indicators on the optical image.

Further, the user may function the inputs 32 to control the operation of the device 10. For example, the user may activate the device 10, provide configuration information as discussed below, and/or determine a first range, a second range, angle, and ballistic information by functioning one or more of the inputs 32.

For instance, the user may align the target T by centering the reticle over the target T and functioning at least one of the inputs 32 to cause the range sensor 12 to determine the first range. Alternatively, the range sensor 12 may dynamically determine the first range for all aligned objects such that the user is not required to function the inputs 32 to determine the first range. Similarly, the tilt sensor 14 may dynamically determine the angle for all aligned objects or the tilt sensor may determine the angle when the user functions at least one of the inputs 32. Thus, the clear shot information discussed herein may be dynamically displayed to the user.

In various embodiments, the device 10 enables the user to provide configuration information. The configuration information includes mode information to enable the user to select between various projectile modes, such as bow hunting and firearm modes. Further, the configuration information may include projectile information, such as a bullet size, caliber, grain, shape, type, etc. and firearm caliber, size, type, sight-in distance, etc.

The user may provide the configuration information to the device 10 by functioning the inputs 32.

Further, the memory 18 may include information corresponding to configuration information to enable the user-provided configuration information to be stored by the memory 18.

In various embodiments, the device 10 is operable to determine a second range to the target T and display an indication of the second range to the user. The computing element 16 determines the second range to the target T by adjusting the first range based upon the angle. Preferably, the computing element 16 determines the second range by multiplying the first range by the sine or cosine of the angle. For instance, when the hunter is positioned above the target, the first range is multiplied by the sine of the angle to determine the second range. When the hunter is positioned below the target, the first range is multiplied by the cosine of the angle to determine the second range.

Thus, the second range preferably represents a horizontal distance the projectile must travel such that the estimated trajectory of the projectile generally intersects with the target T.

High-Resolution Digital Display

Figure 5:
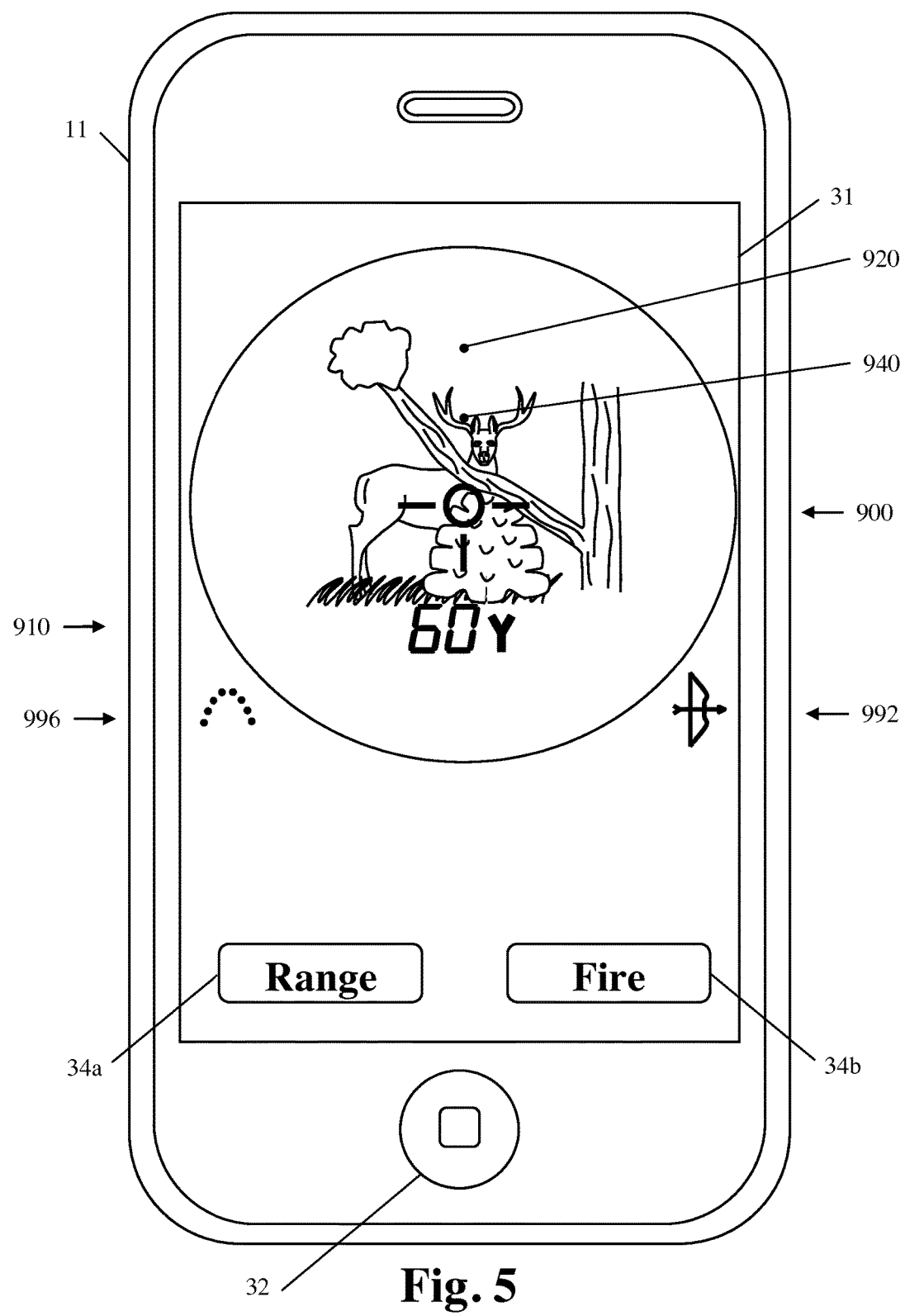
FIG. 5 shows a high-resolution digital display providing a clear shot indication and also shows optional game inputs.

FIG. 5 shows a high-resolution display 31 providing digital video superimposed with a clear shot indication, such as the twenty-yard indicator 920 and the forty-yard indicator 940.

FIG. 5 also shows optional placement of various mode indicators. For example, the bow mode indicator 992 and the trajectory mode indicator 996 are shown in the corners of a rectangular digital, high-resolution display 31, in this example, a touch screen display of an Apple iPhone 11.

One advantage of a digital, high-resolution display 31 is that it is not limited to the circular optical focus area. The additional area of the rectangular display can be used for various purposes. As shown in FIG. 5 the various mode indicators, including bow mode indicator 992, rifle mode indicator 994 (not shown), trajectory mode indicator 996, can be moved outside the circular focus area, for example, to the lower corners. Other indicators, such as the distance indicator 910 angle and second range indicator 990, can also be moved outside the circular focus area. This has the advantage of allowing the circular focus area to be less cluttered and to obscure less of the optical image information. Further, the rectangular high-resolution display 31 can provide more optical information.

Another advantage of a high-resolution display 31 is that the overlay information is produced by software rather than by a hardware chip. Custom hardware chips can be expensive to design and manufacture and are less flexible. The overlay information generated by software for display on the high-resolution display 31 is higher quality, such as easier to read fonts, and move flexible, such as being able to display in different colors or locations of the screen to avoid obscuring the optical information being overlaid. The display can have more options, such as natural languages, different number systems such as Chinese, different units of measure, and so forth. Further, the software can be easily updated to incorporate new features, to improve calculations, or to support addition projectile information. Updates can be made in the field as well as in new models at a lower cost. For example, in some embodiments, new software can be downloaded over the Internet.

Other advantages of high-resolution display 31 will be discussed in references to FIGS. 6 and 7.

High-Resolution Touch Screen Display

FIG. 5 also shows an exemplary touch screen display as an embodiment of the high-resolution display 31. The high-resolution display 31 displays the video image as digitally captured by the digital camera 25 or as simulated by the game software; the overlay information such as the twenty-yard indicator 920 and the forty-yard indicator 940, the cross hairs 900, the distance indicator 910, the mode indicators (e.g. 992 and 996), and the display inputs 34, shown as range button (34a) and fire button (34b). The display inputs 34 are virtual buttons that are tapped on a touch screen, or clicked on with a pointing device (or game controller). The input 32 is a physical button. Both inputs 32 and display inputs 34 provide input to the computing element 16 (FIG. 3).

The embodiment shown comprises a mobile smart phone, in particular an Apple iPhone 11. Correlating FIG. 1 with FIG. 5, the computing element 16 is the processor of the iPhone 11; the memory 18 is the memory of the iPhone 11; the tilt sensor 14 is the accelerometer of the iPhone 11; and the display 30 is the touch screen display of the iPhone 11, an embodiment of the high-resolution display 31. The range sensor 12 is simulated in the game embodiments, or as enhancement to the iPhone 11.

Digital Rangefinder Devices

Figure 6:
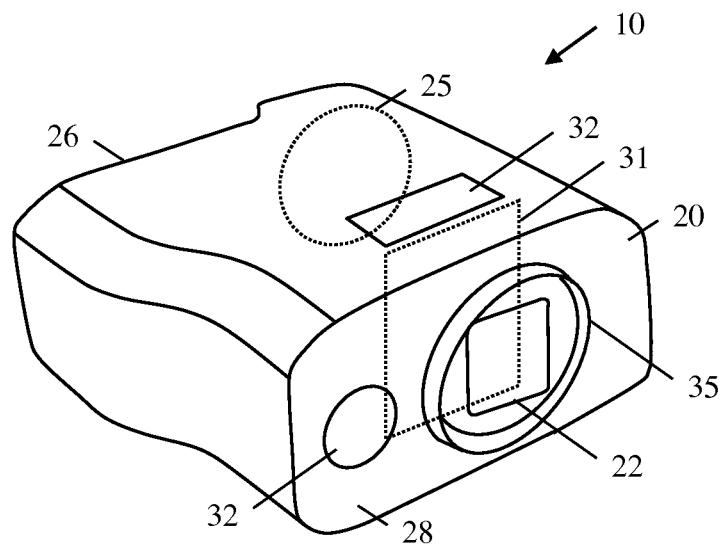
FIG. 6 is a rear perspective view of a digital rangefinder device.
Figure 7:
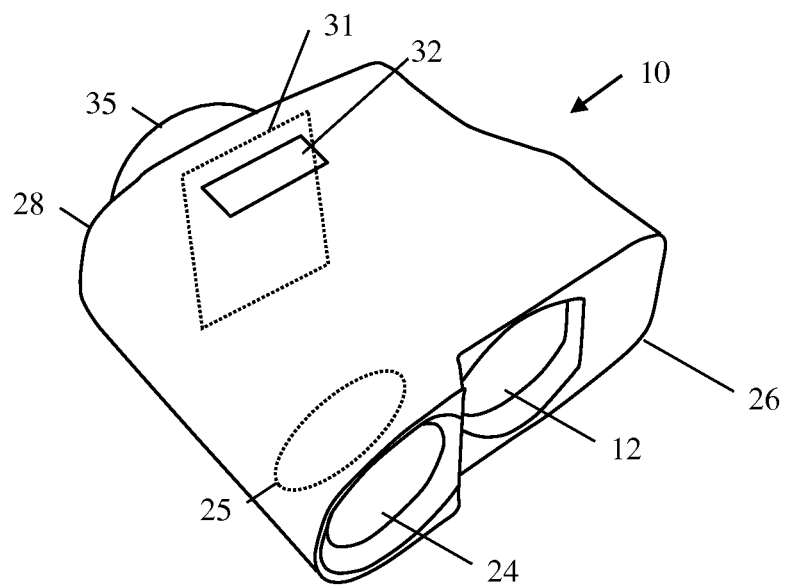
FIG. 7 is a front perspective view of the rangefinder device of FIG. 22.

FIGS. 6 and 7 are rear and front perspective views, respectively, of a digital embodiment of rangefinder device 10.

The digital rangefinder device 10 comprise a housing 20, having an eyepiece 22 at the proximate end 28, a lens 24 and range sensor 12 at the distal end 26, and inputs 32 in various places on exterior. In contrast to the conventional rangefinder, the housing 20 contains a digital camera 25 that captures and digitizes video from the optical image through the lens 24 and contains a digital, high-resolution display 31. The video comprises a series of image frames. The computing element 16 (FIG. 3) processes the image frames, overlays each frame with various indicators, and displays the resulting image on the high-resolution display 31. Further, the high-resolution display 31 is controlled completely by the computing element 16 (FIG. 3) and need not display any of the optical image being captured; instead the high-resolution display 31 may display setup menus, recorded video, or animations generated by the computing element 16 (FIG. 3).

The eyepiece 22 may also be modified to accommodate viewing of the high-resolution display 31. In particular the eyepiece 22 may be inset and be protected by a shroud 35.

In contrast to the conventional rangefinder housing 20, the housing 20 of the digital rangefinder of FIGS. 6 and 7 is more compact, more lightweight, and easier to transport and use, due to removal of the end to end optics. For example, the length between the proximate end 28 and the distal end 26 is shown as less than about four inches. The width and height could be about two inches respectively Enhanced ClearShot Technology for Rifle and Military Markets Various embodiments of the inventions discussed above have been incorporated in Bushnell's The Truth with Clear-Shot™ laser rangefinder. This product has been very successful and has been critically acclaimed and well received by the industry, especially for bow hunting.

However, the layout of the display, e.g. see FIG. 4, with for example, a 4× zoom is limited to relative slow projectiles such as arrows and black powder rifle balls (e.g. less than 400 feet per second), which are typically shot at targets less than 80 yards away.

Modern rifles with high-performance cartridge bullets and other military projectiles such as tank guns can travel 10 to 20 times faster, and can be shot at targets that are hundreds or thousands of yards away. These higher velocity projectiles have a flatter projectile trajectory and the aiming point is closer to the target.

What is needed for higher velocity projectiles, such as those in the rifle hunting, law enforcement, and military industries, is a means for showing a relative aiming point using a reference representing an enlarged view of the target.

Relative Aiming Point

The following sections describe various enhancements to the clear shot technology discussed above, which provide a relative aiming point to meet the needs of users of higher velocity projectiles.

Relative Aiming Point Relative to a Reference of a Predetermined Height

FIGS. 8A through 8E illustrate displays showing embodiments of a relative aiming point 1000 shown relative to a reference of a predetermine size, the reference shown by various means such as a reference image 1002, reference indicators 1006 lines, or a generic reference 1005.

Figure 8A:
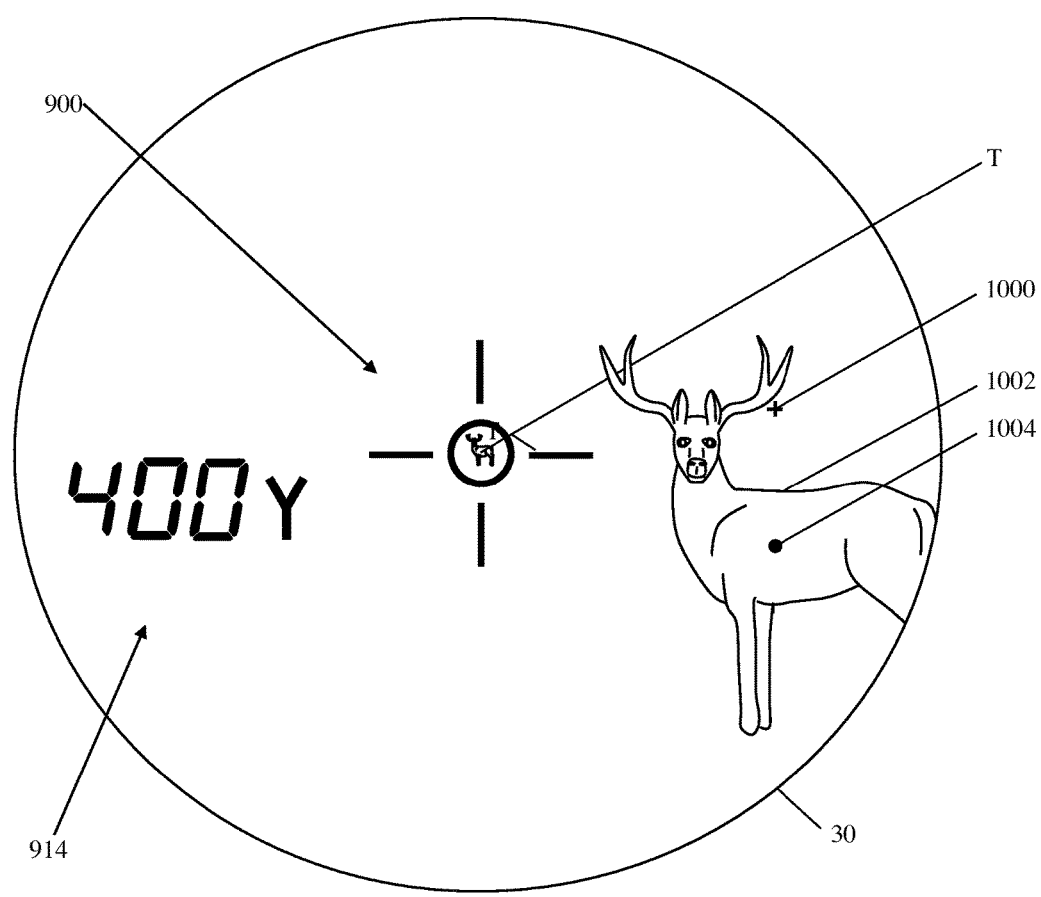
FIGS. 8A through 8E illustrate displays showing embodiments of a relative aiming point 1000 shown relative to a reference of a predetermine size, the reference shown by various means such as a reference image 1002, reference indicators 1006 lines, or a generic reference 1005.

FIG. 8A illustrates a display 30 showing an embodiment of a relative aiming point 1000 shown relative to a reference of a predetermine size. The display 30 shows the active display elements when a target T is ranged at four hundred yards. Note that the target T is visually much smaller than a deer would be when ranged at sixty yards. The display 30 shows cross hairs 900 (shown here with a center circle) which are placed on the target T. The display 30 dynamically shows that the horizontal range is four hundred yards in a horizontal distance indicator 914.

In this embodiment, the reference is shown as a reference image 1002, for example as a generic deer with a chest height of 18 inches. The chest height is measured from the belly to the top of the back. The reference image 1002, such as an image of a deer, can be selected by the user in settings 1034 (discussed below in reference to FIGS. 12A through 12H and in FIG. 15). The user can also set the chest height for the deer, based on predetermined sizes for typical deer, such as 14 inches, 16 inches, or 18 inches.

This embodiment also shows reference target 1004 placed in the reference image 1002.

Operation of the Relative Aiming Point

FIG. 8A shows that the optical image of the deer, target T, at four hundred yards is very small. The indicators as shown in the bow mode embodiment in FIG. 4 do not have high enough precision to be useful for a long-range target T, such as at four hundred yards. This enhancement provides a rifle mode which can be combined with the bow mode in the same device, or which can be implemented independently in rangefinders used in the rifle and military markets.

Initially, the user sets up the rangefinder device 10 by selecting rifle mode; calibrating the device to the zero of the rifle sight or scope, and the ballistic code of the specific ammunition; selecting a reference type (such as the deer references image 1002 as shown); and selecting a reference size. See additional discussion below regarding settings in FIG. 15.

When the user ranges a target T, the rangefinder device 10 determines a line of sight 3 distance (e.g. the laser distance), determines an angle (using a tilt sensor or accelerometer), and then uses the line of sight distance and the angle to determine a horizontal 4 distance to the target T, which is displayed in the horizontal distance indicator 914.

Next, the device 10 determines the projectile trajectory 2. In rifle mode the shape of the parabola is determined by the ballistic code entered in settings 1034. The value of A for the parabola is determined from the ballistic code preferably in a lookup table stored in the device 10. For example, a .270 Winchester, zeroed at 100 yards, has about a 10 inch drop at 285 yards.

After calculating the aiming point 982, in relation to the target T, the reference image 1002 is displayed, and the relative aiming point 1000 is displayed relative to the reference using the predetermined reference height, for example 18 inches.

In the exemplary embodiment shown in FIG. 8A, the deer has a predetermined chest height of 18 inches as set by the user. The relative aiming point 1000 is determined to be about 21 inches based on the ballistic code and the 100 yard zero settings, and based on the horizontal distance of 400 yards determined by the rangefinder device 10.

In the FIG. 8A embodiment, the reference image 1002 has a fixed size and position. The relative aiming point 1000 is displayed dynamically based on the measured horizontal distance using the current ballistic, zero, and reference size settings. If the horizontal distance is less than the zero setting, the relative aiming point 1000 is displayed below the reference target 1004. If the horizontal distance is the same as the zero setting, the relative aiming point 1000 is the reference target 1004. If the horizontal distance is greater that the zero setting the relative aiming point 1000 is displayed above the reference target 1004.

Relative Aiming Point Relative to Reference Lines

Figure 8B:
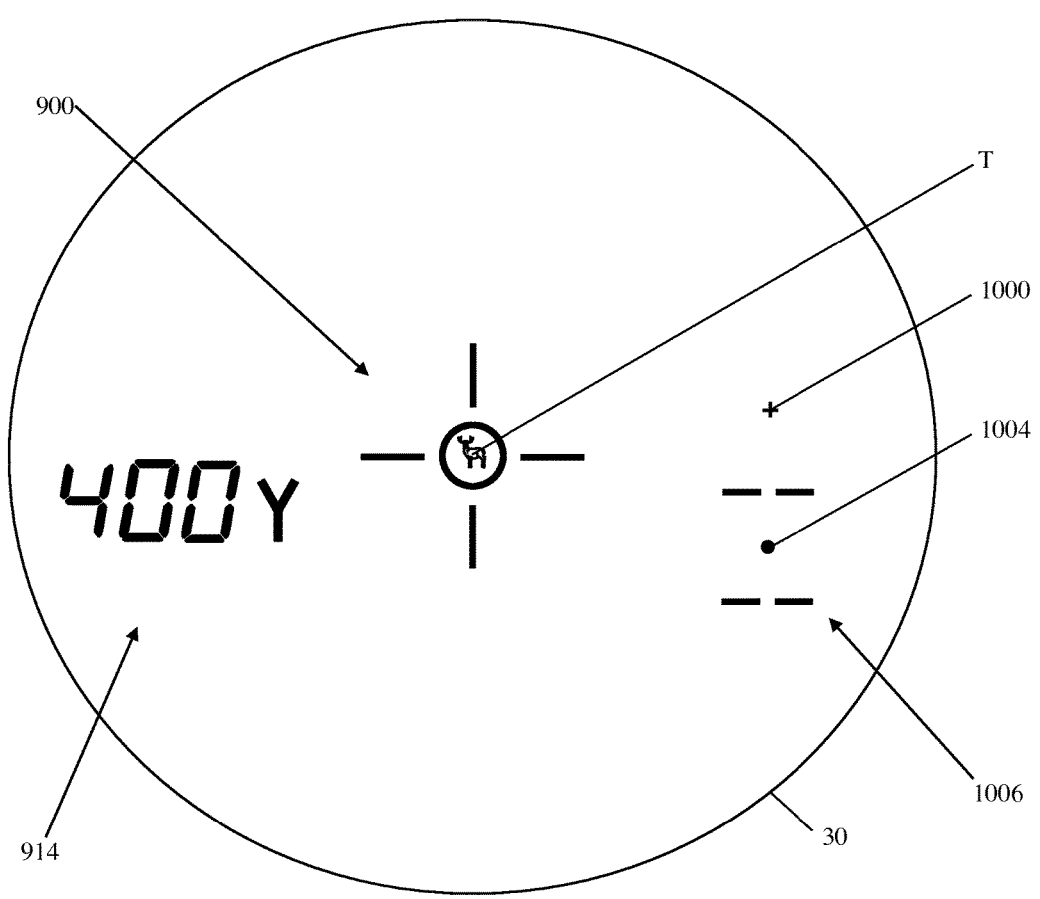

FIG. 8B illustrates a display 30 showing an embodiment of a relative aiming point 1000 shown relative to a reference indicator 1006 shown as reference lines. Like FIG. 8A, the display 30 shows cross hairs 900 and dynamically shows the horizontal range in a horizontal distance indicator 914.

In this embodiment, the reference is shown as the reference indicator 1006 shown as reference lines.

This embodiment also shows reference target 1004 centered in the reference indicator 1006.

In this embodiment, the reference indicator 1006 has a fixed size and position. The relative aiming point 1000 is displayed dynamically based on the measured horizontal distance using the current ballistic, zero, and reference size settings.

Relative Aiming Point Relative to Reference Image and Reference Multiples

Figure 8C:
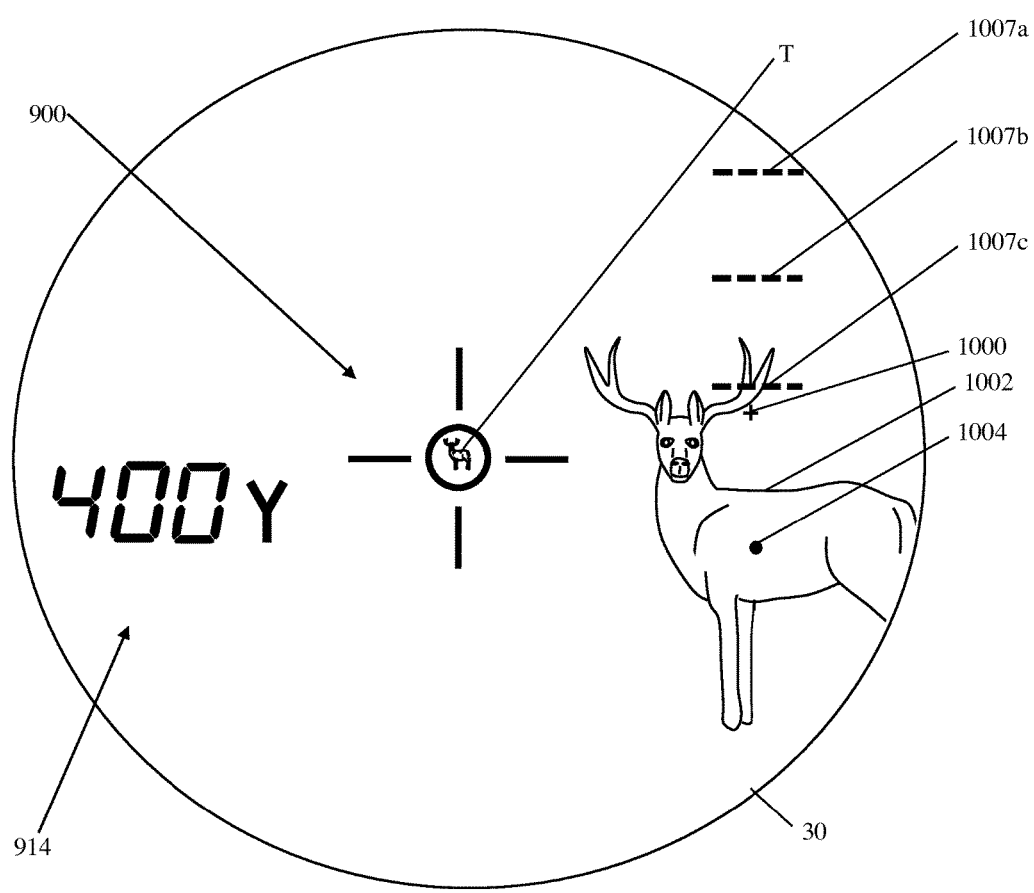

FIG. 8C illustrates a display 30 showing an embodiment of a relative aiming point 1000 shown relative to a reference image 1002 shown as a deer. Like FIG. 8A, the display 30 shows cross hairs 900 and dynamically shows the horizontal range in a horizontal distance indicator 914.

In this embodiment, the reference is shown as the reference image 1002 with a plurality of reference multiples 1007*a-c*, shown as dashed lines. Each reference multiple 1007 is the same height as the reference height, in this example, the same as the chest height of the deer. Reference multiples 1007 are useful for very long shots where the bullet drop larger than the size of the reference. The user 100 can visualize the reference height and then pick an aiming point that is relative to a multiple of the target's visualized height in the scope.

This embodiment also shows reference target 1004 centered in the reference indicator 1006.

In this embodiment, the reference image 1002 and reference multiples 100*a-c* have fixed heights and positions. The relative aiming point 1000 is displayed dynamically based on the measured horizontal distance using the current ballistic, zero, and reference size settings.

Relative Aiming Point Relative to Reference Lines and Reference Multiples

Figure 8D:
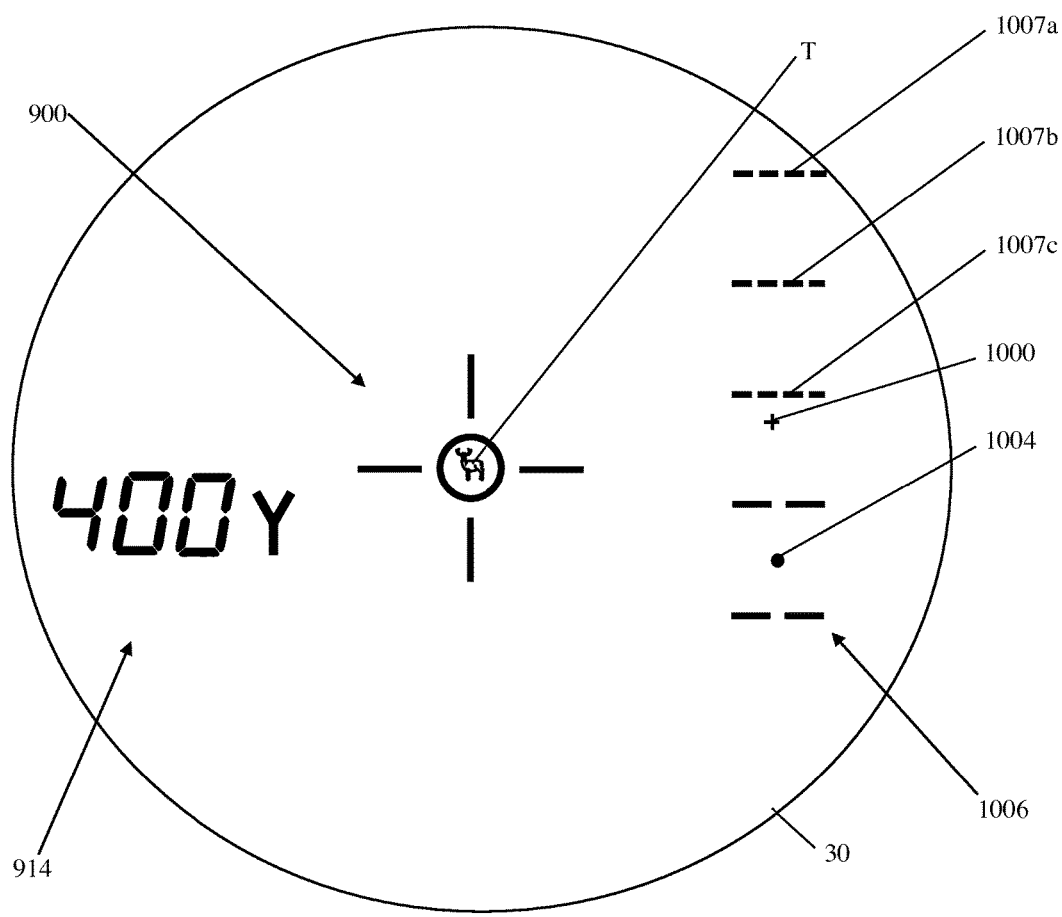

FIG. 8D illustrates a display 30 showing an embodiment of a relative aiming point 1000 shown relative to a reference indicator 1006 shown as reference lines. Like FIG. 8A, the display 30 shows cross hairs 900 and dynamically shows the horizontal range in a horizontal distance indicator 914.

In this embodiment, the reference is shown as the reference indicator 1006 shown as reference lines with a plurality of reference multiples 1007*a-c*, shown as dashed lines. Each reference multiple 1007 is the same height as the reference height. Reference multiples 1007 are useful for very long shots where the bullet drop larger than the size of the reference. The user 100 can visualize the reference height and then pick an aiming point that is relative to a multiple of the target's visualized height in the scope.

This embodiment also shows reference target 1004 centered in the reference indicator 1006.

In this embodiment, the reference indicator 1006 and reference multiples 1007*a-c* have fixed heights and positions. The relative aiming point 1000 is displayed dynamically based on the measured horizontal distance using the current ballistic, zero, and reference size settings.

Relative Aiming Point Relative to Generic Reference

Figure 8E:
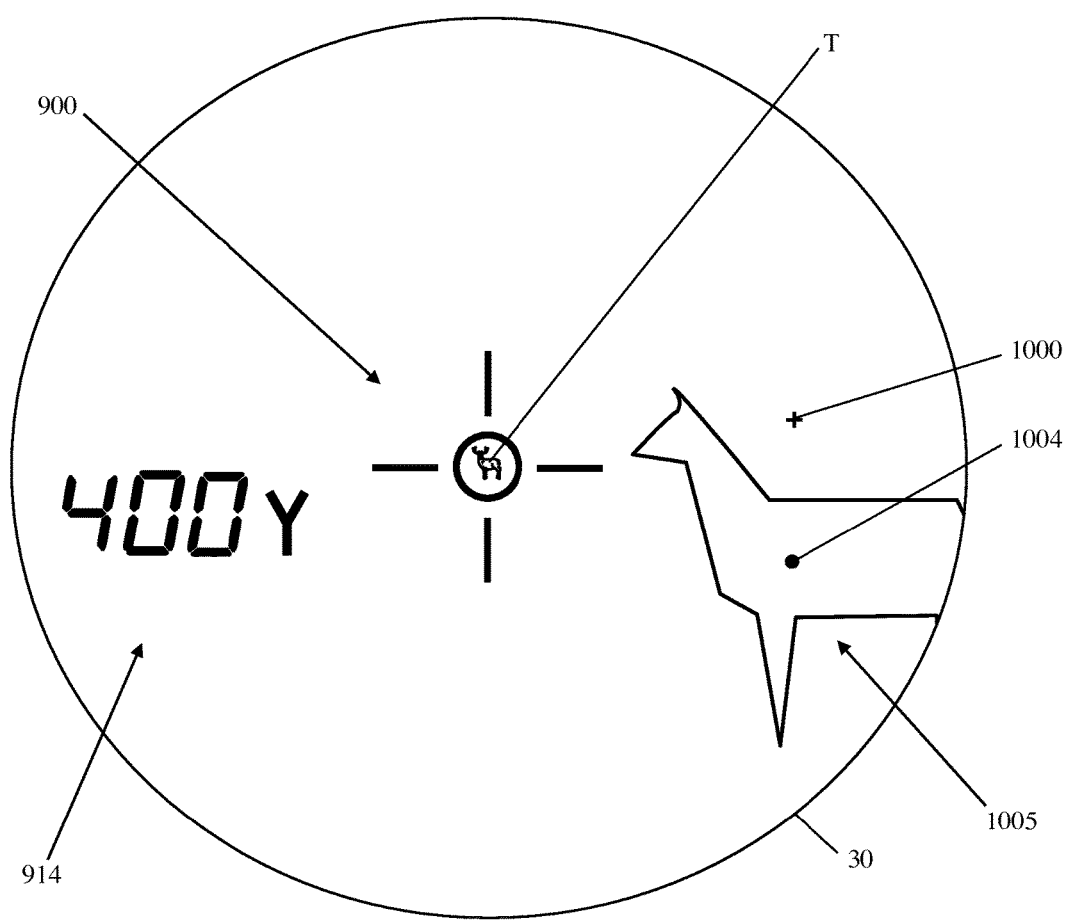

FIG. 8E illustrates a display 30 showing an embodiment of a relative aiming point 1000 shown relative to a generic reference 1005 shown as generic stick figure. Like FIG. 8A, the display 30 shows cross hairs 900 and dynamically shows the horizontal range in a horizontal distance indicator 914.

In this embodiment, the reference is shown as the generic reference 1005. This generic reference 1005 can be used for a variety of four legged mammals, including deer, elk, antelope, moose, coyote, skunk, etc. The generic image can be permanently set simplifying the settings required in this embodiment.

This embodiment also shows reference target 1004 centered in the reference indicator 1006.

In this embodiment, the generic reference 1005 has a fixed height and position. The relative aiming point 1000 is displayed dynamically based on the measured horizontal distance using the current ballistic, zero, and reference size settings.

Relative Aiming Point Options

Figure 9A:
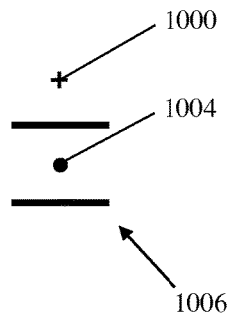
FIGS. 9A through 9C illustrate various options for showing a relative aiming point relative to a reference indicator, including an optional reference target or wind correction.
Figure 9B:
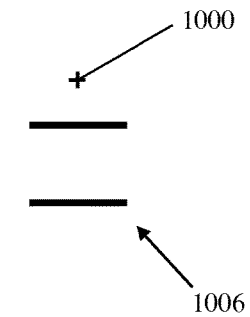
Figure 9C:
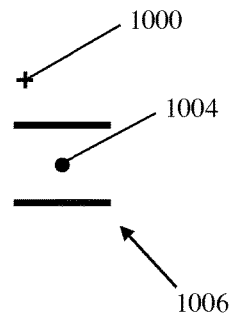

FIGS. 9A through 9C illustrate various options for showing a relative aiming point 100 relative to a reference indicator 1006, including an optional reference target 1004 or wind correction.

FIGS. 9A through 9C illustrate a subset of a display 30 showing embodiments of a relative aiming point 1000 shown relative to a reference indicator 1006 shown as reference lines.

FIG. 9A shows an optional reference target 1004 centered in the reference indicator 1006.

FIG. 9B shows that the optional reference target 1004 can be omitted. While the reference target 1004 is currently preferred and is generally shown in most of the figures in this section, relative aiming point 1000 can be implemented without explicitly showing the reference target 1004, and could be omitted from any specific embodiment.

FIG. 9C shows the relative aiming point 1000 offset from the reference target 1004 wherein the offset adjusts for cross wind drift. In this specific case, the reference target 1004 is useful to visualize the amount of cross wind drift adjustment.

Horizontal Distance and Angle Display Options

Figures 10A, 10B, 10C:
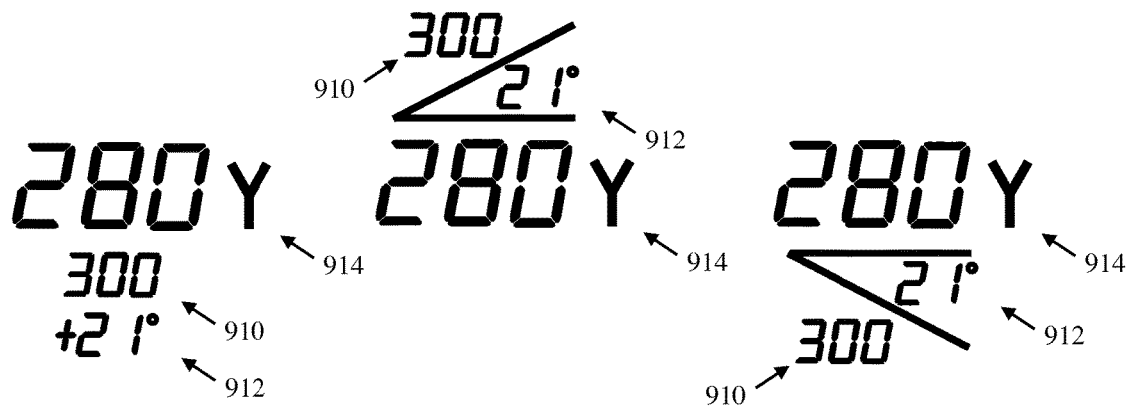
FIGS. 10A through 10C illustrate various options for showing line of sight distance, horizontal distance, and angle.

FIGS. 10A through 10C illustrates various options for showing line of sight distance, horizontal distance, and angle.

In other display layouts, the line of sight distance indicator 910 is displayed in larger digits while the angle and horizontal distance is display in smaller digits. However, the most important number for the user 10 is the horizontal distances. An improved display layout having better user interface design will show only the horizontal distance (see FIG. 11A) or show the horizontal distance as the primary number (see FIGS. 10A through 10C, and FIG. 11B).

FIG. 10A shows a portion of a display 30 where a horizontal distance indicator 914 has the largest digits, with a distance indicator 910 and an angle indicator 912 shown below in smaller digits.

FIGS. 10B and 10C shows a portion of a display 30 where a horizontal distance indicator 914 has the largest digits, with a distance indicator 910 and an angle indicator 912 both in smaller digits, shown above when the target T is uphill (FIG. 10B, see also FIG. 3B) and shown below when the target T is downhill (FIG. 10C, see also FIG. 3C). This embodiment is more intuitive and shows graphically the horizontal distance indicator 914 next to the horizontal line in the angle graphic, the angle indicator 912 inside the angle, and the line of sight distance indicator 910 next to an uphill line in a first angle graphic (FIG. 10B) or next to a downhill line in a second angle graphic (FIG. 10C). In contrast to FIG. 10A the user does not have to recognize and interpret the plus or minus sign in the angle indicator 912; instead it is shown graphically for better user cognition.

Display Layouts for Relative Aiming Point

Figure 11A:
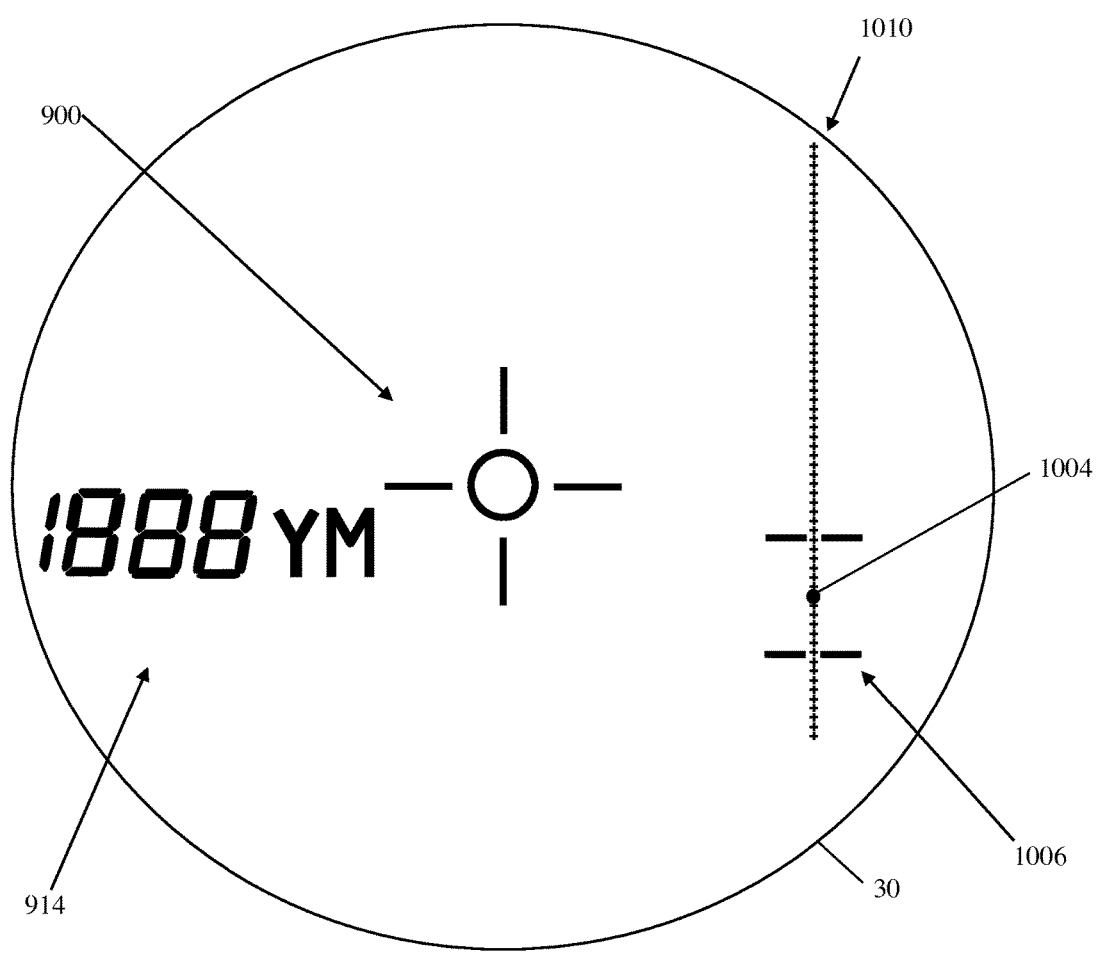
FIGS. 11A and 11B show embodiments of layout for the display segments.
Figure 11B:
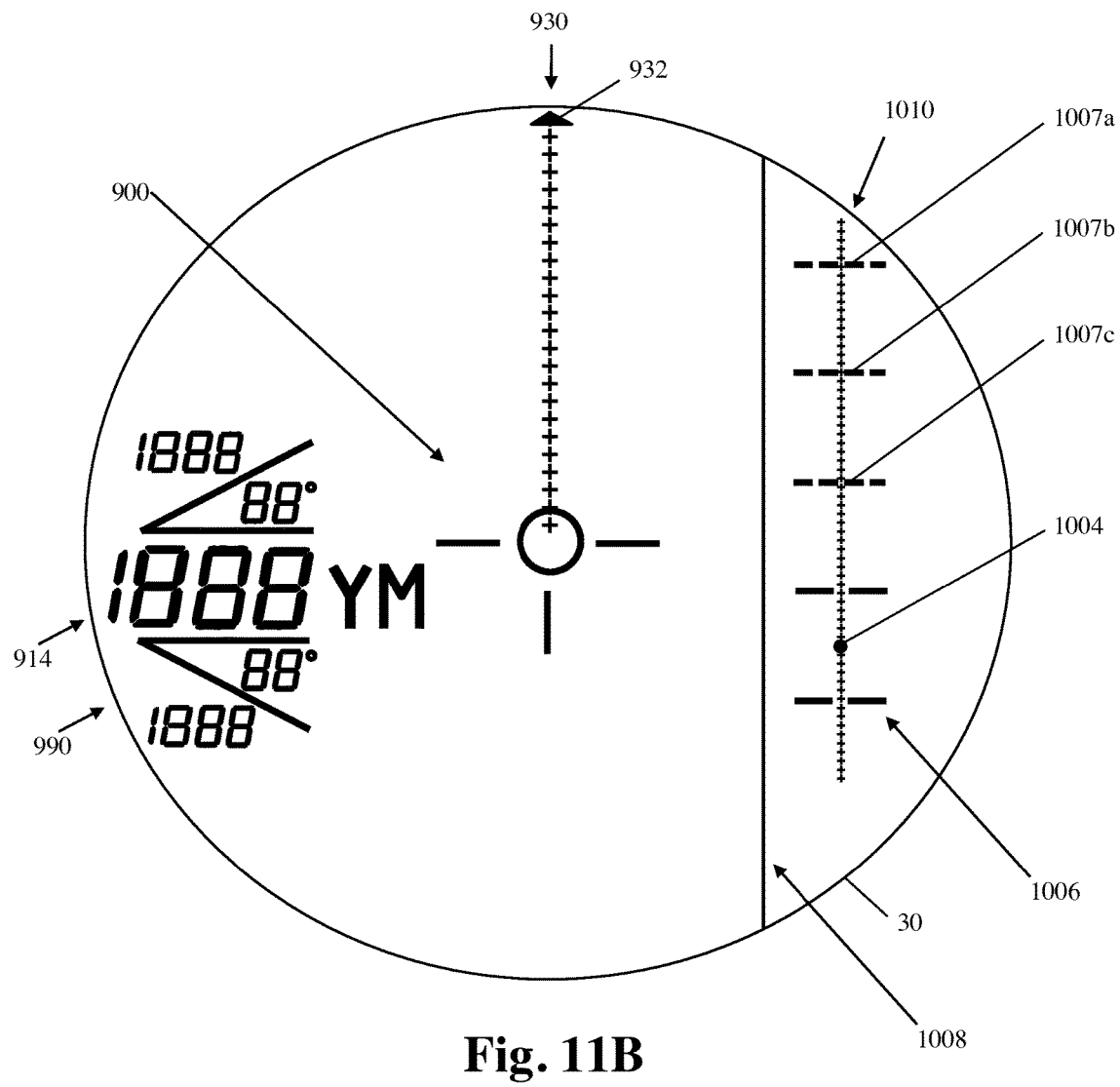

FIGS. 11A and 11B show embodiments of layout for the display segments.

FIG. 11A shows an embodiment of a layout for the display segments. An exemplary display 30 comprises segments forming cross hairs 900, a horizontal distance indicator 914, a reference target 1004, a reference indicator 1006, and a plurality of selectable aiming point indicators 1010.

The plurality of selectable aiming point indicators 1010 are dynamically and selectively illuminated to provide the relative aiming point 1000.

In other embodiments, two or more reference images 1002 or a generic reference 1005 could also be added to the layout, each as a single segment, which are dynamically and selectively illuminated to provide the reference based on the settings. See FIGS. 12A through 12H and FIG. 15.

FIG. 11B shows an embodiment of a more robust layout for the display segments. An exemplary display 30 comprises segments forming cross hairs 900, a horizontal distance indicator 914, selectable path indicators 930, an off screen indicator 932, angle and second range indicator 990, a reference target 1004, a reference indicator 1006, reference multiples 1007a-c, a separator 1008, and a plurality of selectable aiming point indicators 1010.

This embodiment supports the improved layout of FIGS. 10B and 10C.

The separator 1008 may be useful to help the user separate the target image and the relative aiming point portions of the display.

In hybrid embodiments, the selectable path indicators 930 would illuminate when the target T was close (e.g. visually larger than the reference height, such as 1006) and the reference target 1004, the reference indicator 1006, reference multiples 1007a-c, the separator 1008, and one of the plurality of selectable aiming point indicators 1010 would illuminate when the target was far.

User Selectable Reference Images and Reference Sizes

FIGS. 12A through 12H show embodiments of various reference images 1002 with relative aiming points 1000.

Figure 12A:
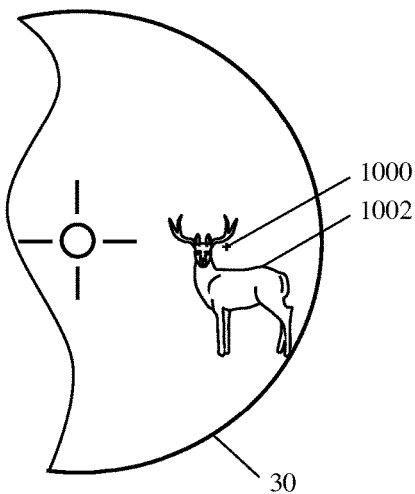
FIGS. 12A through 12H show embodiments of various reference images.

FIG. 12A shows the reference image 1002 as a deer. When a deer is selected the user can also select from corresponding chest heights. Mule deer have chest heights that average 18 inches. Whitetail deer have chest heights that average 16 inches. Deer height ranges could be between 14 and 18 inches.

Figure 12B:
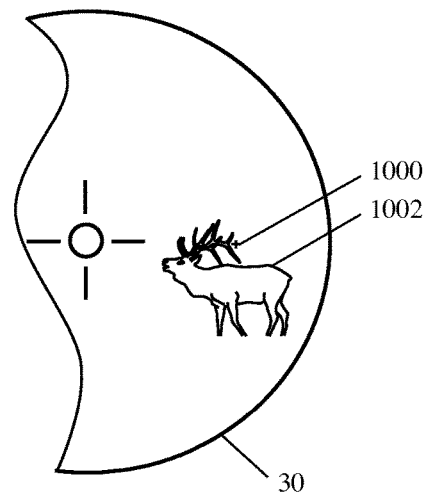

FIG. 12B shows the reference image 1002 as an elk. When an elk is selected the user can also select from corresponding chest heights. Elk have chest heights that average 25 inches.

Figure 12C:
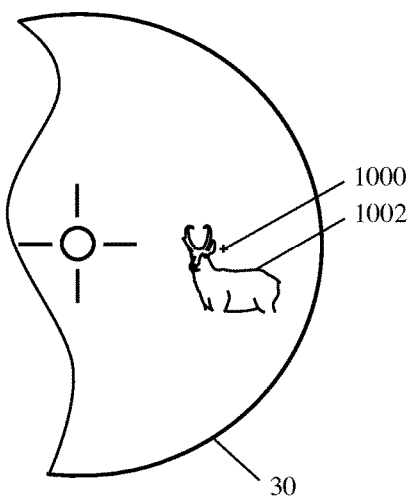

FIG. 12C shows the reference image 1002 as an antelope. When an antelope is selected the user can also select from corresponding chest heights. Antelope have chest heights between 15 and 16 inches.

Figure 12D:
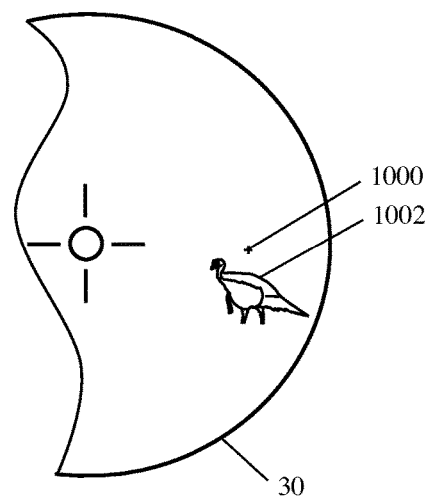

FIG. 12D shows the reference image 1002 as a turkey. When a turkey is selected the user can also select from corresponding reference body heights.

Figure 12E:
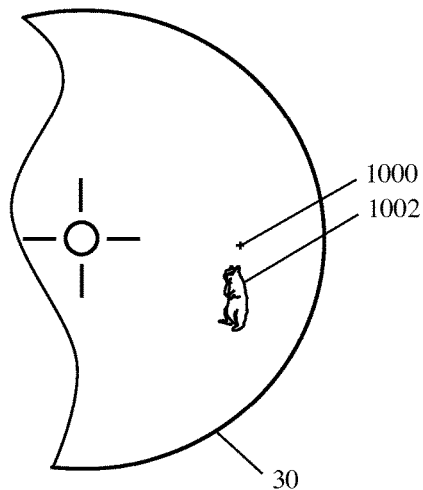

FIG. 12E shows the reference image 1002 as a prairie dog. When a prairie dog is selected the user can also select from corresponding chest heights.

Figure 12F:
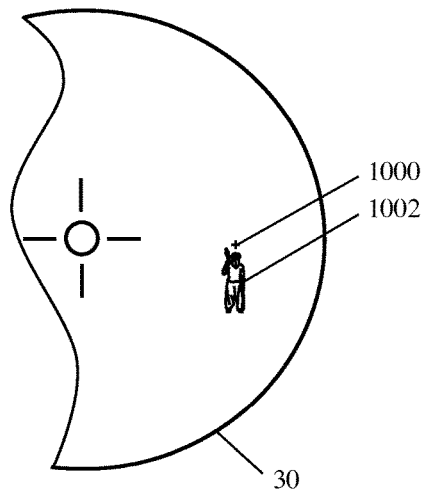

FIG. 12F shows the reference image 1002 as a terrorist. When a terrorist is selected the user can also select from corresponding body heights. Terrorists, for example, could have body heights between 4.5 and 6.5 feet.

Figure 12G:
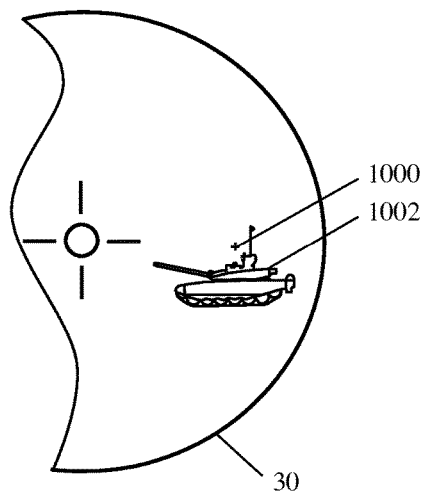

FIG. 12G shows the reference image 1002 as a tank. When a tank is selected the user can also select from corresponding vehicle heights.

Figure 12H:
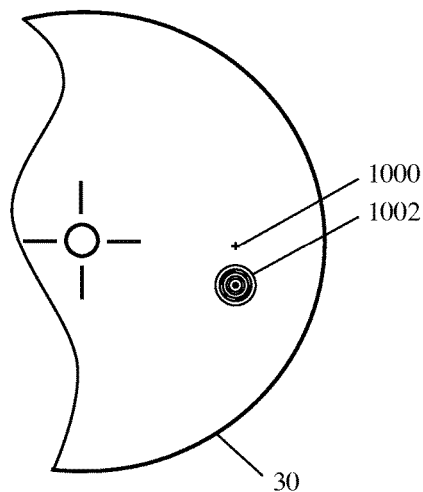

FIG. 12H shows the reference image 1002 as a target. When a target is selected the user can also select from corresponding target heights. Targets range from 6 inches to 36 inches.

Other reference images could include coyote, big horn sheep (20 inches), goats (20 inches) and moose (34 to 40 inches).

Aiming Point Relative to Enlarged Target Display

Figure 13:
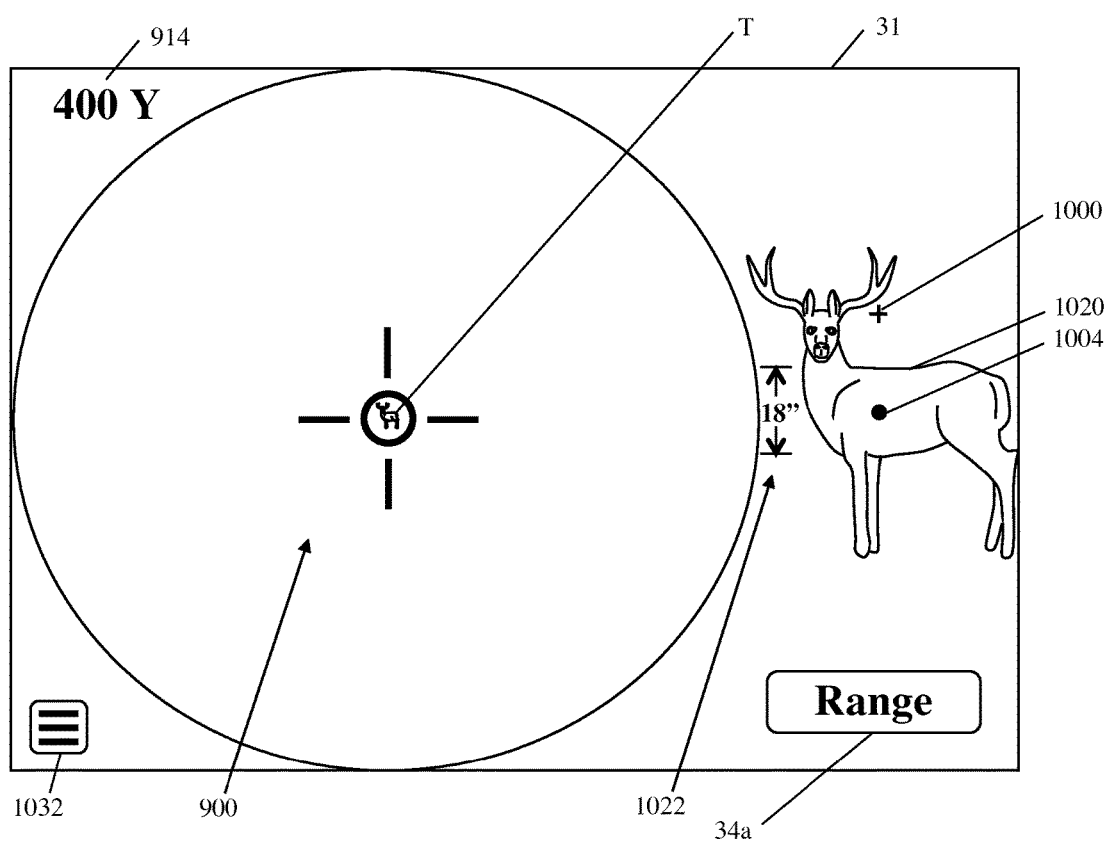
FIG. 13 illustrates a digital display showing a relative aiming point relative to an enlarged target image.

FIG. 13 illustrates a digital display 31 showing a relative aiming point 1000 relative to an enlarged target image 1020.

FIG. 13 illustrates a digital display 31 showing an embodiment of a relative aiming point 1000 shown relative to a reference of a predetermine size. The digital display 31 shows cross hairs 900 (shown here with a center circle) which are placed on the target T. The digital display 31 dynamically shows that the horizontal range is four hundred yards in a horizontal distance indicator 914.

In this embodiment, the reference is shown as an enlarged target image 1020. The enlarged target image 1020 is separate and distinct display element from the target T. When the target T is ranged, a digital snapshot is taken of the target T. The line of sight distance to the target T is known and thus can be enlarged to provide a reference of a predetermined size. The digital device 10 can optionally measure the chest height from the belly to the top of the back, and display the chest height in reference measurement 1022.

This embodiment also shows reference target 1004 placed in the reference image 1002.

The user 100 can range the target by tapping anywhere on a touch screen. Alternatively the user can click a physical button on the device or an optional virtual button on the screen such as the range button identified as input 34*a*.

The operation is similar to the operation of the display as described in reference to FIG. 8A, with the reference image 1002 being the enlarged target image 1020, and the optional calculation of the actual reference height.

The digital display 31 also provides an input to enter set up mode, i.e. a virtual settings control 1032 buttons. When the input is selected the device enters setup mode (see FIG. 15).

Aiming Point Relative to Zoomed Target Display

FIGS. 14A through 14D illustrate embodiments of digital displays 31 showing relative aiming points 1000 relative to an zoomed target image, and zoom controls 1030.

Figure 14A:
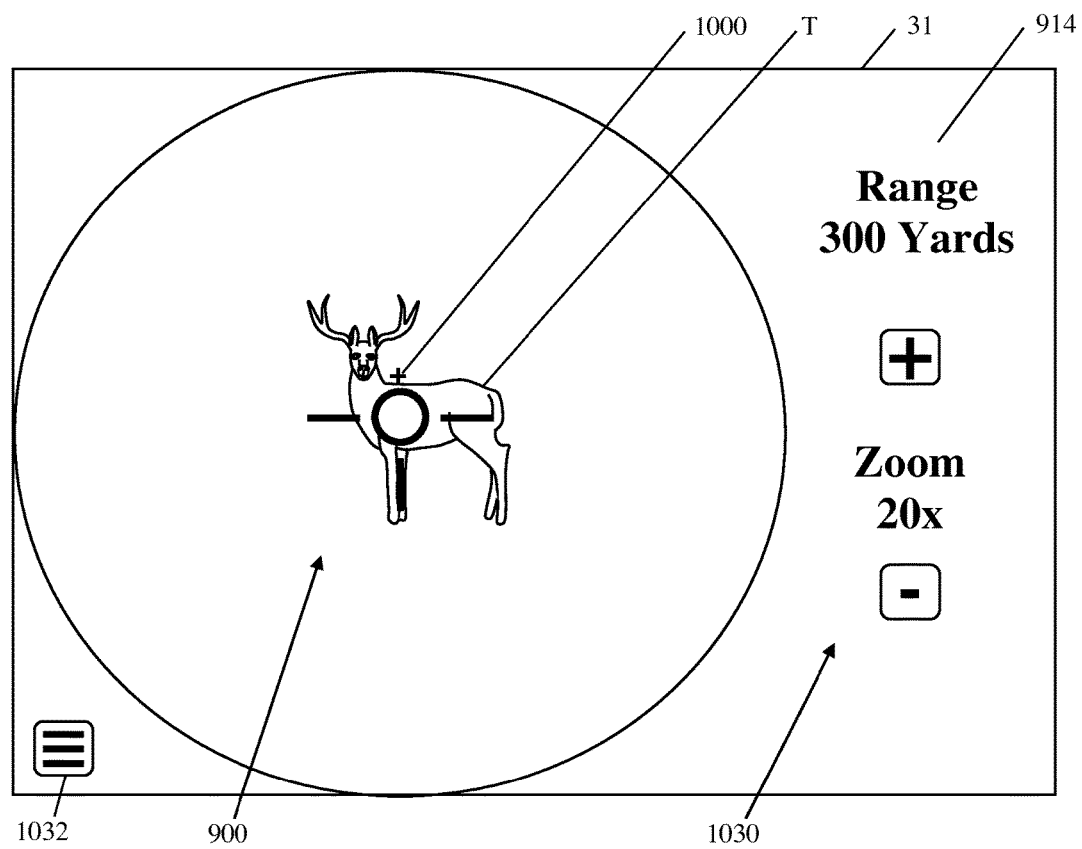
FIGS. 14A through 14D illustrate embodiments of digital displays showing relative aiming point relative to an zoomed target image, and zoom controls.

FIG. 14A illustrates a digital display 31 showing a relative aiming point 1000 relative to an zoomed target T image.

FIG. 14A illustrates a digital display 31 showing an embodiment of a relative aiming point 1000 shown relative to a reference of a predetermine size. The digital display 31 shows cross hairs 900 (shown here with a center circle) which are placed on the target T. The digital display 31 dynamically shows that the horizontal range is three hundred yards in a horizontal distance indicator 914.

In this embodiment, the reference is shown as a zoomed image of the target T. There is not separate reference.

The digital display includes a zoom control 1030 which allows the user 100 to zoom in and zoom out, and which displays the current zoom factor, e.g. 20×.

The user 100 can range the target by tapping anywhere on a touch screen (except in the zoom control). Alternatively the user can click a physical button on the device or a virtual button on the screen (not shown).

The operation is similar to the operation of the display as described in reference to FIG. 8A, with the reference image 1002 being the zoomed image of target T.

The digital display 31 also provides an input to enter set up mode, i.e. a virtual settings control 1032 buttons. When the input is selected the device enters setup mode (see FIG. 15).

Figure 14B:
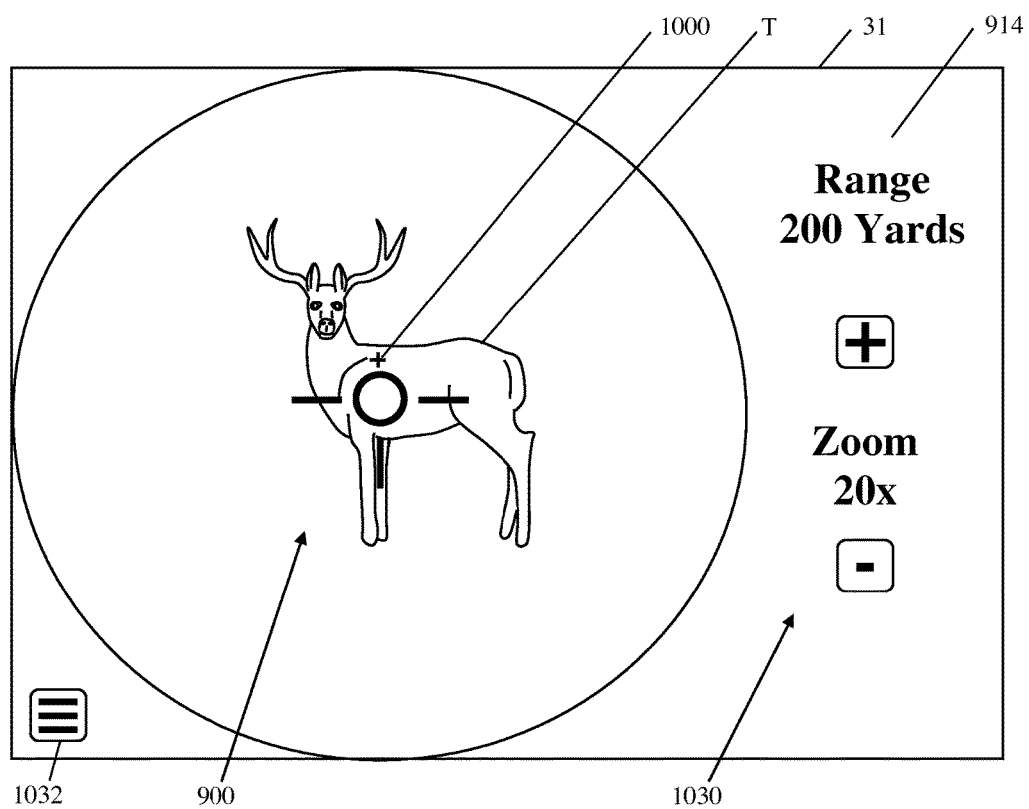

FIG. 14B shows the same embodiment as FIG. 14A where the target T is ranged at 200 yards. Notice that the deer appears larger at the same zoom factor because it is closer. The relative aiming point 1000 is relative lower than in the 300 yard example of FIG. 14A. In this example, the relative aiming point 1000 is below the deer's back.

Figure 14C:
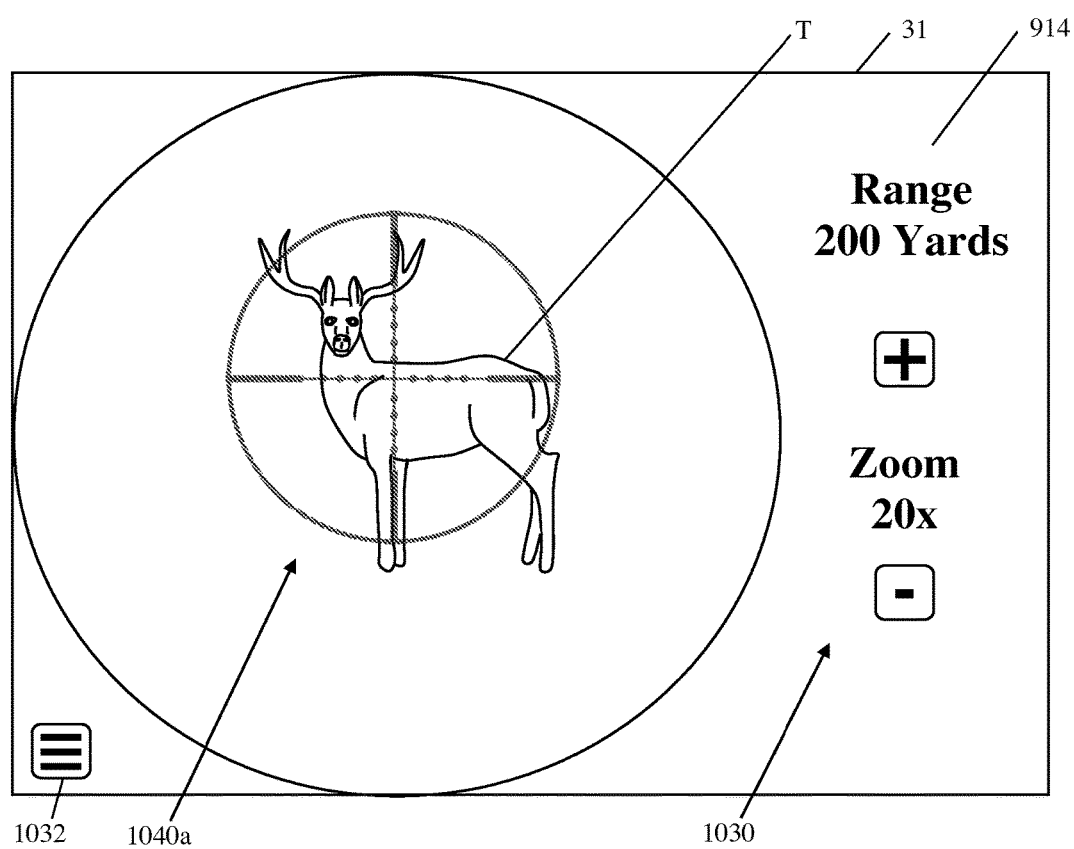

FIG. 14C shows the same embodiment as FIG. 14B where the target T is ranged at 200 yards. However instead of a small relative aiming point 1000 indicator, the relative aiming point 1000 is shown as a virtual reticle 1040*a*, shown as a mil-dot reticle. The virtual reticle 1040*a* is scaled to show the user 100 exactly what the user 100 will see in the corresponding physical scope. The type of reticle and the zoom factor of the scope would be addition settings associated with this embodiment.

Figure 14D:
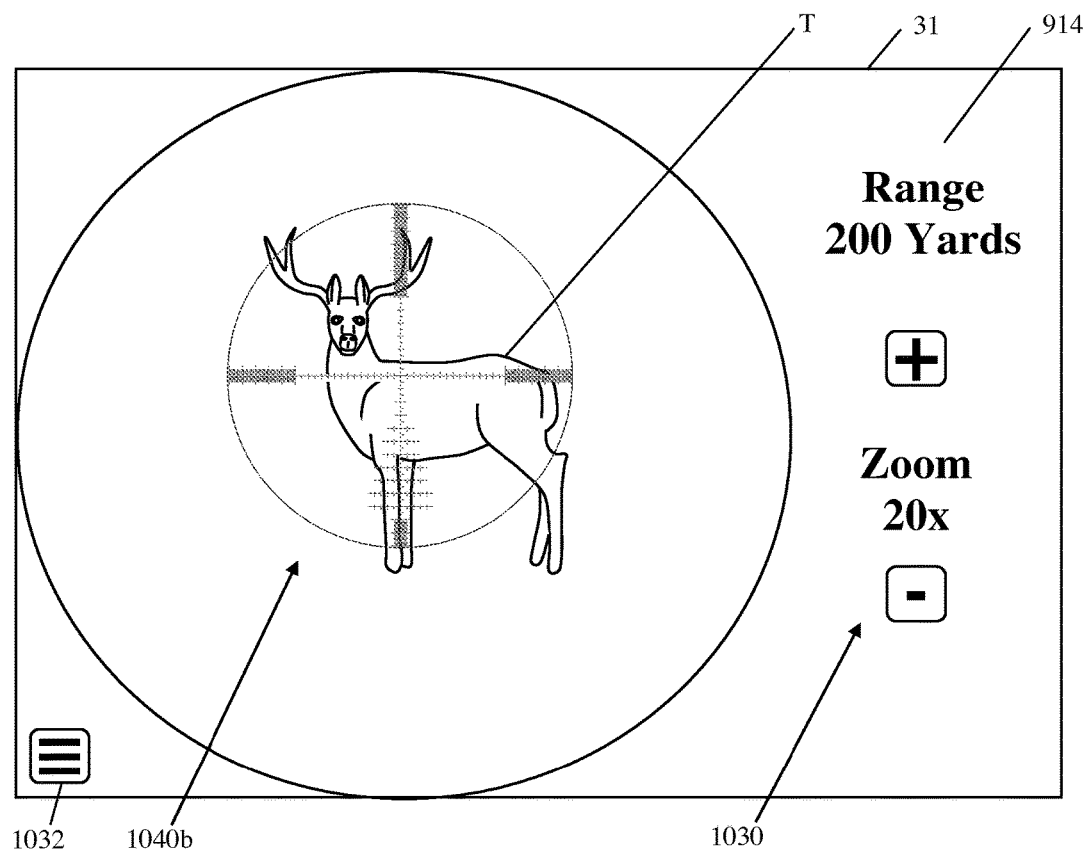

FIG. 14D shows the same embodiment as FIG. 14C where the target T is ranged at 200 yards. However the virtual reticle 1040*b* is shown as a G2 reticle. The virtual reticle 1040*a* is scaled to show the user 100 exactly what the user 100 will see in the corresponding physical scope.

Settings and Calibration Related to Relative Aiming Point Embodiments

Various settings have been discussed above.

Figure 15:
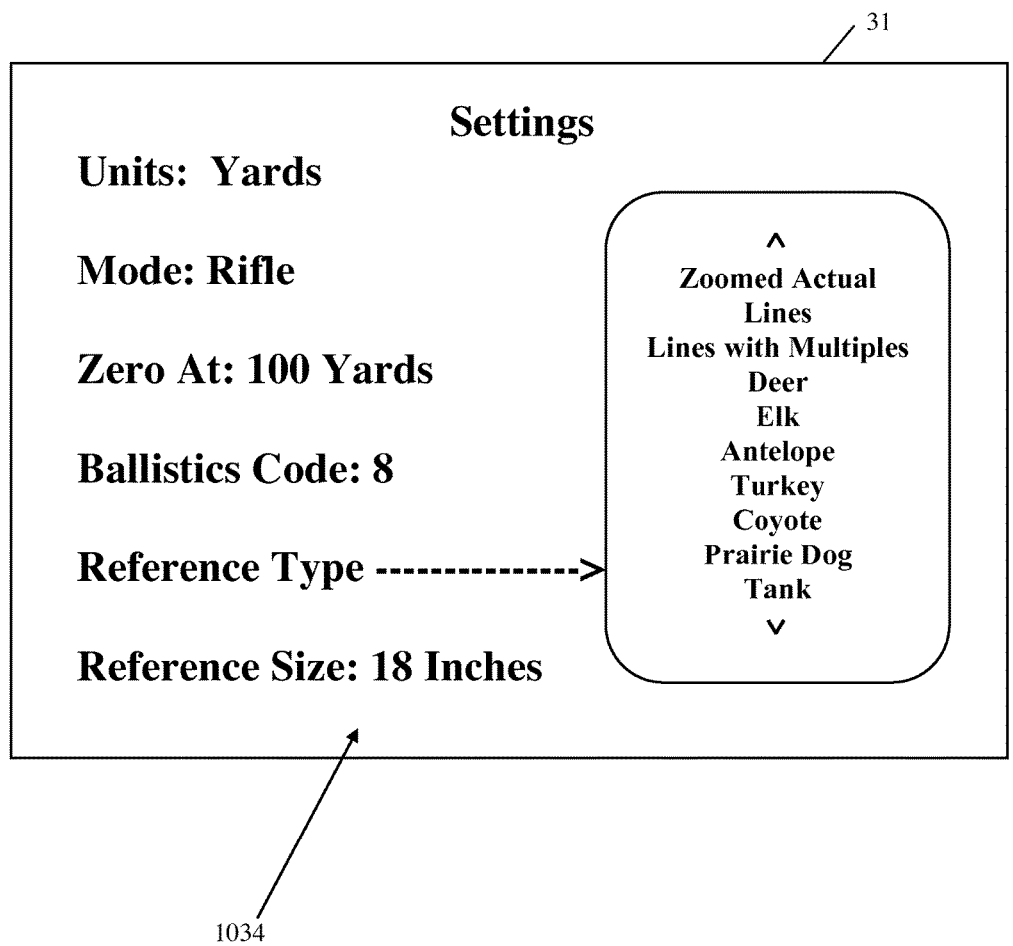
FIG. 15 illustrates a digital embodiment of a display showing various settings.

FIG. 15 illustrates a digital embodiment of a display showing various settings 1034.

Settings for units (i.e. yards or meters) and mode (bow or rifle) are well known as discussed above.

In some embodiments, the device 10 can be simplified by assuming that sight or scope is zeroed at 100 yards. In more complex embodiments (such as the one shown), the user can calibrate the device 10 to the sight or scope be setting a "zero at" setting.

In the preferred embodiment, the user would enter a ballistics code that indicates the characteristics of a specific ammunition and weapon. In rifle mode, the ballistics code is used to determine the projectile trajectory 2. Alternatively, the user enters the bullet drop, for example, in inches, at the zero at distance.

The reference type can also be set in settings. The exemplary embodiment shown in FIG. 15 shows the current setting as reference type and the choices include zoomed actual (e.g. FIGS. 14A through 14D), lines (e.g. FIG. 8B), lines with multiples (e.g. FIG. 8D), deer (e.g. FIG. 12A), elk (e.g. FIG. 12B), antelope (e.g. FIG. 12C), turkey (e.g. FIG. 12D), coyote, prairie dog (e.g. FIG. 12E), tank (e.g. FIG. 12G), and others not visualized but accessible by selecting the scroll arrows at the top or bottom of the list. Alternatively in a simpler embodiment having only reference lines or a generic reference, the reference type can be removed for the required settings.

Once the reference type is selected, then the reference size can also be selected from corresponding ranges of sizes (as discussed above in relations to FIGS. 12A through 12H).

A digital display 31 provides a more robust interface as shown in FIG. 15. However, the same settings can be made on a display 30 such as a display with LCD segments.

Although the invention has been described with reference to the preferred embodiments illustrated in the attached drawings, it is noted that equivalents may be employed and substitutions made herein without departing from the scope of the invention as recited in the claims.

Advantages

Faster

The clear shot technology and relative aiming point technology provides the user with visual indications that do not require mathematical calculations or adjustments. The user immediate sees and image in the rangefinder device, which is then replicated with the weapon. In other words, the user stays "right brained" allowing for rapid and accurate action.

Accurate

The clear shot technology provides an accurate projective trajectory to a ranged target that takes into account the obstacles that may be in the trajectory.

The relative aiming point technology provides an accurate aiming point relative to the target size reference.

Effective

Because the clear shot technology provides an accurate projective trajectory to a ranged target that takes into account the obstacles that may be in the trajectory, the user can adjust the position of the shot to ensure that an unexpected obstacle will not interfere with the shot. Thus, the first shot will always reach its target being more effective.

The relative aiming point technology provides an accurate aiming point that can the user can intuitively match.

Confidence

The clear shot technology gives the user confidence that despite numerous obstacles that may be near a projectile trajectory that a difficult shot can be successfully taken.

The relative aiming point technology gives the user confidence that the target will be hit.

This increased confidence will improve the user's performance and satisfaction.

Increased Safety

The clear shot provides increased safety. In some embodiments any obstacle in the projectile trajectory is indicated in the display. In a situation where obstacles cannot be ranged because of intervening obstacles, the clear shot indication is not provided. Thus, the user is assured that any obstacle that may be impacted by the projectile will not be unknowingly harmed.

Adjustable

The embodiments of these displays and rangefinders can be adjusted to be consistent with an individual user and associated sights, for example the specific pins on a individual user's bow sight and specific ammunition and scopes.

Lightweight

The enhanced features of the clear shot technology do not add weight to the convention device. Embodiments with a digital camera and a high-resolution display have lighter weight than conventional rangefinders.

Easy to Transport and Use

Devices containing the clear shot technology are easy to transport and use. Embodiments with a digital camera and a high-resolution display are smaller.

Fun

Games containing displays simulating the clear shot technology are fun to play and help introduce a new generation of potential sportsman to the archery and shoot sports.

CONCLUSION, RAMIFICATION, AND SCOPE

Accordingly, the reader will see that the enhanced displays, rangefinders, and methods provide important information regarding the projectile trajectory and importantly provide greater accuracy, effectiveness, and safety.

While the above descriptions contain several specifics these should not be construed as limitations on the scope of the invention, but rather as examples of some of the preferred embodiments thereof. Many other variations are possible. For example, the display can be manufactured in different ways and/or in different shapes to increase precision, reduce material, or simplify manufacturing. Further, this technology could be applied to military situations where the projectiles is fired from a cannon, tank, ship, or aircraft and where the obstacles could be moving objects such as helicopters or warfighters. Further, the path indicators could indicate points in the trajectory beyond the target, should the projectile miss the target. On the battlefield with three-dimensional information, e.g. from satellite imaging and computer maps and charts, a computer using clear shot technology could aim an fire multiple weapons over mountains and through obstacles to continuously hit multiple targets. Additionally, the clear shot technology could be applied to golf where in a golf mode the device would indicate which club would result in a ball trajectory that would provide a clear shot through trees and branches. The variations could be used without departing from the scope and spirit of the novel features of the present invention.

Accordingly, the scope of the invention should be determined not by the illustrated embodiments, but by the appended claims and their legal equivalents.

We claim:

1. An electronic display for an electronic range finding device for indicating to a user a relative aiming point for a target,
    wherein the electronic range finding device is capable of determining an absolute aiming point,
    the electronic display comprising:
        a) a visual image of the target and the surroundings of the target,
        b) a cross hairs displayed over the visual image and positioned centrally in the display, wherein the cross hairs is used to aim the range finding device at the visual image of the target,
        c) a reference, having a predetermined reference height, displayed over the visual image and positioned peripherally in the display, wherein the reference is separate and distinct from the cross hairs, and
        d) a relative aiming point displayed over the visual image and positioned centered relative to the reference, wherein the relative aiming point corresponds to a sight or scope calibrated for the predetermined range,
            wherein the relative aiming point is separate and distinct from the absolute aiming point, wherein the absolute aiming point is determined in relation to the cross hairs and the visual image of the target,
    wherein, when the range finding device determines a range to the target, the relative aiming point is dynamically displayed to indicate where to aim the calibrated sight or scope.

2. The electronic display of claim 1, further comprising a reference target placed in the reference.

3. The electronic display of claim 1, wherein the reference is a reference image.

4. The electronic display of claim 1, wherein the reference is a generic reference image.

5. The electronic display of claim 1, wherein the reference is a user selectable reference image.

6. The electronic display of claim 5, wherein the user selectable reference image is one of the group of a deer, elk, or antelope.

7. The electronic display of claim 5, wherein the user selectable reference image is of a tank.

8. The electronic display of claim 1, wherein the reference is a reference indicator.

9. The electronic display of claim 8, wherein the reference indicator comprises horizontal lines separate by a predetermined reference height.

10. The electronic display of claim 1, further comprising a plurality of reference multiples positioned above the reference indicating multiples of the predetermined reference height.

11. The electronic display of claim 1, further comprising a plurality of aiming point indicators, wherein one of the plurality of aiming point indicators is selectively illuminated to show the relative aiming point corresponding to a predetermined ballistic setting, the predetermined reference height, and calculated horizontal distance to the target.

12. The electronic display of claim 1, further comprising a horizontal distance indicator.

13. The electronic display of claim 12, further comprising an angle indicator.

14. The electronic display of claim 1, wherein the reference is an enlarged target image separate from the visual image of the target.

15. The electronic display of claim 1, further comprising a zoom control, wherein an image of the target is displayed at a zoom factor indicated by the zoom control, and
    wherein the reference is the zoomed image of the target.

16. The electronic display of claim 1, wherein the relative aiming point is a virtual reticle.

17. A method of using the electronic display of claim 1, comprising the steps of:
    i) determining a range to a target,
    ii) determining the projectile trajectory based on predetermined ballistic settings, and
    iii) dynamically displaying the relative aiming point based on the determined range and the predetermine reference height of the reference.

18. A system comprising the electronic display of claim 1, the system further comprising:
- d) a housing containing a computing element, the display, and the memory,
- e) a range sensor for determining a first line of sight distance to the target,
- f) a tilt sensor for determining an angle to the target,
- g) at least one input on the surface of the housing,
- h) a lens for receiving the optical image of the target, and
- i) an eyepiece for viewing the display, wherein the range sensor, tilt sensor, and input are connected to the computing element, wherein the lens and eyepiece are connected to the housing, wherein the system is a handheld rangefinder device.

19. The system of claim 18, further comprising a reference measurement, wherein the computing element recognizes the characteristics of an image of the target and calculates the actual height of the target.

20. The system of claim 18, further comprising a digital camera, wherein the display is a high-resolution display, and wherein the handheld rangefinder device is a high-resolution handheld rangefinder device.

* * * * *